United States Patent
Svitak et al.

(10) Patent No.: US 11,587,194 B2
(45) Date of Patent: Feb. 21, 2023

(54) VEHICLE FLOATING FLEET SYSTEMS AND METHODS

(71) Applicant: SpotHero, Inc., Chicago, IL (US)

(72) Inventors: Gregory Stephen Svitak, Chicago, IL (US); Mateusz Perlak, Lake Zurich, IL (US)

(73) Assignee: SpotHero, Inc., Chicago, IL (US)

( * ) Notice: Subject to any disclaimer, the term of this patent is extended or adjusted under 35 U.S.C. 154(b) by 217 days.

(21) Appl. No.: 16/891,331

(22) Filed: Jun. 3, 2020

(65) Prior Publication Data

US 2020/0380631 A1 Dec. 3, 2020

Related U.S. Application Data

(60) Provisional application No. 62/856,333, filed on Jun. 3, 2019.

(51) Int. Cl.
  *G06Q 50/30* (2012.01)
  *G08G 1/00* (2006.01)
  (Continued)

(52) U.S. Cl.
  CPC .............. *G06Q 50/30* (2013.01); *G01S 19/01* (2013.01); *G06Q 10/02* (2013.01);
  (Continued)

(58) Field of Classification Search
  None
  See application file for complete search history.

(56) References Cited

U.S. PATENT DOCUMENTS 6,636,145 B1 10/2003 Murakami et al.
7,177,738 B2 2/2007 Diaz
(Continued)

FOREIGN PATENT DOCUMENTS

CN 103295395 A 9/2013
DE 102013224190 A1 * 5/2015 ............. B60R 25/10
(Continued)

OTHER PUBLICATIONS

Williams, Robert. "Hertz, SpotHero Partner on Mobile Parking Reservation Tool." Marketing Drive, Published Feb. 14, 2018, Retrieved from {URL: https://www.marketingdive.com/news/hertz-spothero-partner-on-mobile-parking-reservation-tool/517059/}. (Year: 2018).*

(Continued)

*Primary Examiner* — Susanna M. Diaz
(74) *Attorney, Agent, or Firm* — Dinsmore & Shohl LLP

(57) ABSTRACT

Embodiments herein are directed to a vehicle floating fleet vehicle system for determining a location of a user and one or more car-sharing vehicles. The system includes a server computing device operated by a floating fleet service provider. The server computing device includes at least one processor; a memory communicatively coupled to the at least one processor; and machine readable instructions stored in the memory. The machine readable instructions cause the vehicle floating fleet system to perform at least the following when executed by the at least one processor receive a request for the one or more car-sharing vehicles, determine the one or more car-sharing vehicles in one or more nearby gated parking facilities, send information about the one or more car-sharing vehicles to the user, and receive a selected car-sharing vehicle in a nearby gated parking facility of the one or more nearby gated parking facilities from the user.

18 Claims, 9 Drawing Sheets

(51) Int. Cl.
*G06Q 10/06* (2012.01)
*G06Q 10/08* (2012.01)
*G06Q 30/06* (2012.01)
*G06Q 30/02* (2012.01)
*G06Q 20/08* (2012.01)
*G06Q 10/02* (2012.01)
*G06Q 30/04* (2012.01)
*G01S 19/01* (2010.01)
*G06Q 10/0631* (2023.01)
*G06Q 10/087* (2023.01)
*G06Q 30/0645* (2023.01)
*G06Q 30/0601* (2023.01)
*G06Q 30/0283* (2023.01)

(52) U.S. Cl.
CPC ..... *G06Q 10/06315* (2013.01); *G06Q 10/087* (2013.01); *G06Q 20/0855* (2013.01); *G06Q 30/0284* (2013.01); *G06Q 30/04* (2013.01); *G06Q 30/0627* (2013.01); *G06Q 30/0639* (2013.01); *G06Q 30/0645* (2013.01); *G08G 1/207* (2013.01); *G06Q 2240/00* (2013.01)

(56) References Cited

U.S. PATENT DOCUMENTS

| | | | |
|---|---|---|---|
| 10,235,816 B2 | 3/2019 | Dutta et al. | |
| 2003/0090363 A1* | 5/2003 | Ogura | G07F 17/244 340/5.4 |
| 2010/0280700 A1* | 11/2010 | Morgal | G06Q 10/02 705/5 |
| 2012/0116825 A1* | 5/2012 | Gallais | G07C 5/008 705/5 |
| 2012/0188100 A1* | 7/2012 | Min | G08G 1/146 340/932.2 |
| 2013/0073349 A1* | 3/2013 | Kolling | G07B 15/02 705/13 |
| 2015/0073645 A1* | 3/2015 | Davidsson | B62D 15/0285 701/23 |
| 2015/0185034 A1* | 7/2015 | Abhyanker | G05D 1/0088 701/23 |
| 2015/0254762 A1* | 9/2015 | Fisher | G06Q 30/08 705/26.3 |
| 2015/0325058 A1* | 11/2015 | Lambrinos | G07B 15/04 705/13 |
| 2015/0346727 A1* | 12/2015 | Ramanujam | G05D 1/0088 701/23 |
| 2016/0247327 A1* | 8/2016 | Kozawa | G06Q 50/30 |
| 2017/0329346 A1* | 11/2017 | Latotzki | G08G 1/164 |
| 2018/0047220 A1* | 2/2018 | Savoure | H04W 12/06 |
| 2019/0108700 A1* | 4/2019 | Chelnik | G07C 9/28 |
| 2019/0228345 A1* | 7/2019 | Oesterling | G08G 1/14 |
| 2019/0311454 A1* | 10/2019 | Mitsumaki | H04L 67/12 |
| 2019/0318275 A1* | 10/2019 | Sakurada | G06Q 50/30 |
| 2020/0311623 A1* | 10/2020 | Noguchi | B60W 60/00253 |
| 2021/0042670 A1* | 2/2021 | Hirose | G06Q 50/30 |

FOREIGN PATENT DOCUMENTS

| | | | | |
|---|---|---|---|---|
| DE | 102015202488 A1 | * | 8/2016 | ............ B60N 2/002 |
| DE | 102018220433 A1 | * | 5/2020 | ............ B60R 25/04 |
| DE | 102019113720 A1 | * | 11/2020 | |
| EP | 3040937 A1 | * | 7/2016 | ............ G06Q 10/06 |
| EP | 3220318 A1 | * | 9/2017 | ............ G06Q 10/02 |
| JP | 5646781 B2 | * | 12/2014 | ............ G06Q 10/02 |
| JP | 2017045233 A | * | 3/2017 | |
| JP | 2017102553 A | * | 6/2017 | |
| JP | 2018190463 A | * | 11/2018 | ............ G06Q 10/02 |
| KR | 20150020738 A | * | 2/2015 | |
| KR | 101720854 B1 | * | 4/2017 | |
| WO | 2017096307 A1 | | 6/2017 | |
| WO | 2018226600 A1 | | 12/2018 | |
| WO | 2019054883 A1 | | 3/2019 | |

OTHER PUBLICATIONS

"SpotHero Partners With Hertz to Provide Smart Parking Solutions to Rental Car Customers." Businesswire. Feb. 13, 2018. Retrieved from {URL: https://www.businesswire.com/news/home/20180213005342/en/SpotHero-Partners-With-Hertz-to-Provide-Smart-Parking-Solutions-to-Rental-Car-Customers}. (Year: 2018).*

Brulte & Company. "Autonomous Vehicle Drop-off and Pick-up Zones." Published Feb. 6, 2016. Retrieved from {URL: https://www.brulteco.com/autonomous-vehicle-drop-off-pick-zones/}.*

Jul. 11, 2019,; LocoMobi Introduces Patent-Pending Bluetooth Access Control Technology to Connect the Parking and Transportation Ecosystem. Retrieved Oct. 2, 2020, from https://locomobiworld.com/archive/locomobi-introduces-patent-pending-bluetooth-access-control-technology-to-connect-the-parking-and-transportation-ecosystem/.

* cited by examiner

VEHICLE FLOATING FLEET SYSTEMS AND METHODS

CROSS-REFERENCE TO RELATED APPLICATION

The present application claims priority to U.S. Provisional Patent Application Ser. No. 62/856,333 filed on Jun. 2, 2019, and entitled "Floating Fleet Systems and Methods," the contents of which are incorporated herein in its entirety.

TECHNICAL FIELD

The present disclosure generally relates to the field of vehicle sharing. More particularly, disclosed embodiments relate to floating fleet systems and methods that enable users to pick-up and drop-off vehicles at any gated parking facility rather than a dedicated pick-up and drop-off location.

BACKGROUND

Car sharing, autonomous vehicle companies and/or car rental services provide the ability for a user to rent a vehicle for a period of time. The cars are provided at a dedicated pick-up and drop-off location that is controlled by the car sharing company. As an example, a user may go to the dedicated pick-up and drop-off location, reserve a car located at the pick-up and drop-off location, drive the vehicle as needed, and then drop-off the car at either the original pick-up and drop-off location or another pick-up and drop-off location. In each case, the user is required to drop-off the car at a dedicated pick-up and drop-off location that is controlled by the car sharing company so that another user may rent the car.

Although this arrangement is convenient, there are several disadvantages. A user is required to travel to a dedicated pick-up and drop-off location to pick-up a car. This location may be far from the user and, because the user needs a car in the first place, it may be difficult for the user to travel to the dedicated pick-up and drop-off location. Additionally, the return pick-up and drop-off location may be far from the user's destination, which may require the user to secure additional transportation from the return pick-up and drop-off location to his or her ultimate destination.

SUMMARY

In one embodiment, a vehicle floating fleet system for determining a location of a user and one or more car-sharing vehicles is provided. The system includes a server computing device operated by a floating fleet service provider. The server computing device includes at least one processor; a memory communicatively coupled to the at least one processor; and machine readable instructions stored in the memory. The machine readable instructions cause the vehicle floating fleet system to perform at least the following when executed by the at least one processor receive a request for the one or more car-sharing vehicles, determine the one or more car-sharing vehicles in one or more nearby gated parking facilities, send information about the one or more car-sharing vehicles to the user, and receive a selected car-sharing vehicle in a nearby gated parking facility of the one or more nearby gated parking facilities from the user.

In another embodiment, a vehicle floating fleet system for selecting one or more car-sharing vehicles is provided. The system includes a user interface operated by a user. The user interface includes at least one processor; a memory communicatively coupled to the at least one processor; and machine readable instructions stored in the memory. The machine readable instructions cause the vehicle floating fleet system to perform the following when executed by the at least one processor transmit a request for the one or more car-sharing vehicles, display a location of one or more nearby gated parking facilities and display a plurality of information regarding the one or more car-sharing vehicles in the one or more nearby gated parking facilities based on a predetermined radius of a determined location of the user interface, and transmit a selected car-sharing vehicle in a nearby gated parking facility of the one or more nearby gated parking facilities from the user interface.

In yet another embodiment, a method for a vehicle float fleet system is provided. The method includes initiating, by a user interface by a user, a request for a car-sharing vehicle, determining, by a server computing device, a location of the user interface and determining, by the server computing device, the one or more car-sharing vehicles in one or more nearby gated parking facilities. The method continues by providing, by the server computing device, one or more available car-sharing vehicles within the one or more nearby gated parking facilities, displaying, on the user interface, the one or more available car-sharing vehicles within the one or more nearby gated parking facilities, selecting, on the user interface, a selected car sharing vehicle, and removing, by the server computing device, the selected car sharing vehicle from the one or more available car-sharing vehicles within the one or more nearby gated parking facilities.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to improved vehicle floating fleet systems and methods. In embodiments of the present disclosure, the user may drop off a reserved car sharing vehicle at any gated parking facility (e.g., gated garage or gated parking lot) and thus the user is not required to drop the vehicle off at a dedicated pick-up and drop-off location. Because the vehicle floating fleet system enables car sharing vehicles to be dropped off in any gated parking facility, the vehicles within the service may be better distributed throughout an area. Therefore, the likelihood of a vehicle being close to a potential user is increased. The user may then not need to travel as far to reserve a vehicle. Additionally, the user now has the benefit of parking the vehicle much closer to his or her destination.

Example embodiments and features of vehicle floating fleet systems are described below.

As used herein, the term "communication" and/or "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, and the like.

Figure 1:
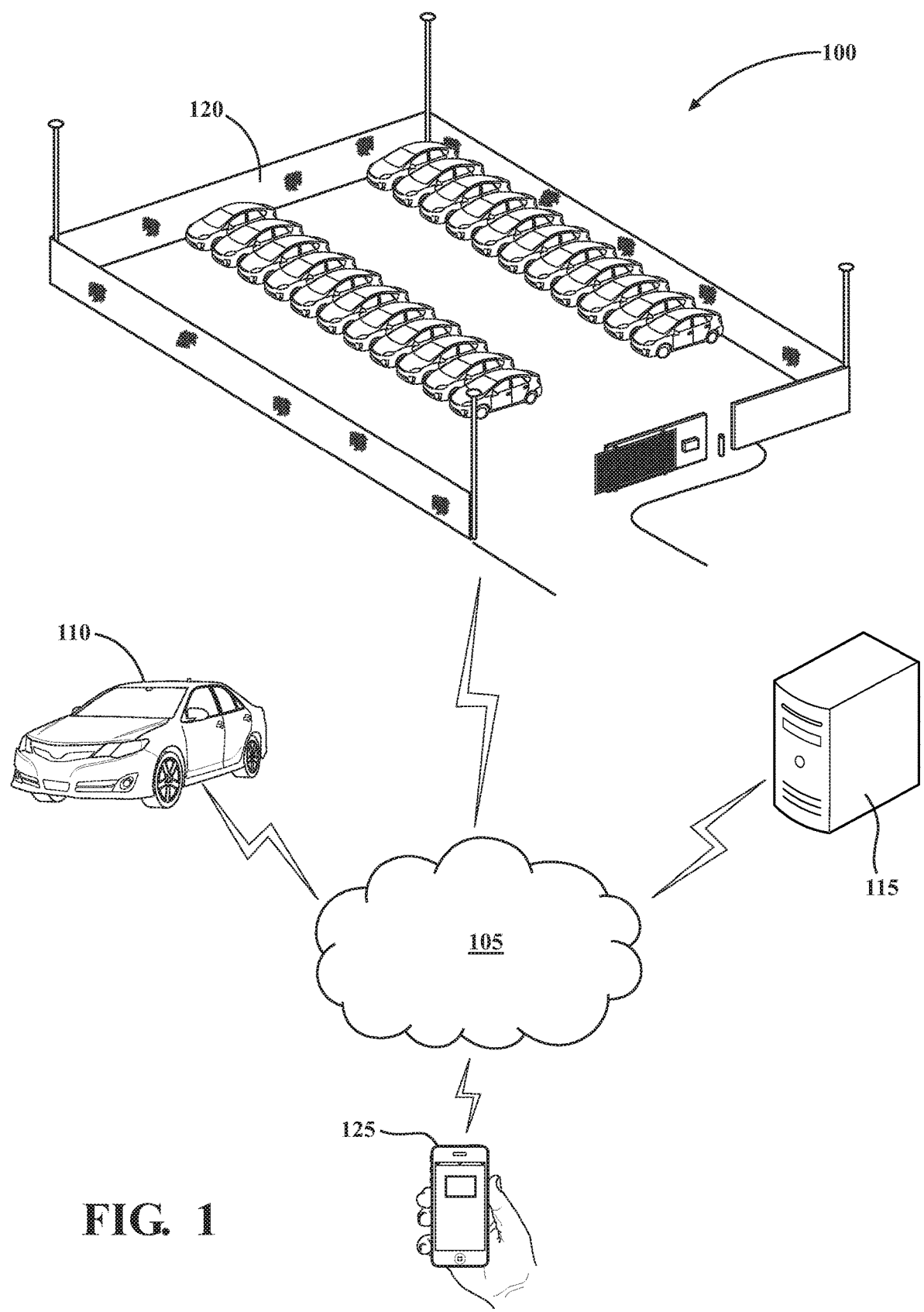
FIG. 1 schematically depicts an illustrative computing network having components for a vehicle floating fleet vehicle system according to one or more embodiments described and illustrated herein.

Referring now to the drawings, FIG. 1 depicts an illustrative network having components for a vehicle floating fleet system, generally designated 100, that enables car-sharing vehicles to be picked up and/or dropped off in any gated parking facility according to embodiments shown and described herein. As illustrated in FIG. 1, a network 105 may include a wide area network (WAN), such as the Internet, a local area network (LAN), a mobile communications network, a public service telephone network (PSTN), a personal area network (PAN), a metropolitan area network (MAN), a virtual private network (VPN), Bluetooth network, a low power LAN (LPAN), a ultrawide band network (UWB) and/or another network. The network 105 may generally be configured to electronically connect one or more devices such as computing devices and/or components thereof, vehicles and/or components thereof, user interfaces and/or components thereof, and gated parking facilities, and/or components thereof. Illustrative devices may include, but are not limited to, an example car-sharing vehicle 110, a server computing device 115, a gated parking facility 120, and/or a user interface device 125.

The example car-sharing vehicle 110 may generally be any vehicle with one or more onboard computing devices, particularly computing devices that contain hardware for receiving data, processing data, storing data, and/or transmitting data. Further, the example car-sharing vehicle 110 may capture and process images and or video in or around the example car-sharing vehicle 110. Thus, the example car-sharing vehicle 110 and/or components thereof may perform one or more computing functions, such as receiving data, capturing image data, processing data, storing data and the like for machine learning algorithms, such that the vehicle may have an autonomous mode, as described in greater detail herein.

The server computing device 115 may receive data from one or more sources, generate data, store data, index data, and/or provide data to the user interface device 125, the gated parking facility 120 and/or the example car-sharing vehicle 110 (or components thereof). In some embodiments, the server computing device 115 may employ one or more machine learning algorithms that are used for the purposes of determining a plurality of available vehicles to rent, a gated parking facility to pick up and/or drop off the example car-sharing vehicle, directing a user to the selected example car-sharing vehicle, navigating the example car-sharing vehicle to a gate of the gated parking facility when in an autonomous mode, and the like. As such, it should be appreciated that the vehicle on board computing systems may function with the server computing device 115 such that the vehicle on board computing systems may navigate in the autonomous mode and/or employ the one or more machine learning algorithms.

The gated parking facility 120 may receive data from one or more sources, generate data such as vehicle locations (e.g., global positioning data) within the gated parking facility 120, store data, and/or provide data to the user interface device 125, the server computing device 115, and/or the example car-sharing vehicle 110 (or components thereof). In some embodiments, the gated parking facility 120 may employ Bluetooth, GPS, and the like purposes of assisting in guiding and navigating the example car-sharing vehicle in autonomous mode, to confirm a vehicle parking location, to communicate with the example car-sharing vehicle such as opening and/or closing a gate of the gated parking facility 120, and the like, as discussed in greater detail herein. As such, it should be appreciated that the vehicle on board computing systems may function with the gated parking facility 120 such that the vehicle on board computing systems may navigate in the autonomous mode, determine the parking location of the example car-sharing vehicle, and/or communicate with the gate of the gated parking facility 120.

The user interface device 125 may generally be used as an interface between a user and the other components connected to the network 105. Thus, the user interface device 125 may be used to perform one or more user-facing functions, such as receiving one or more inputs from a user or providing information to the user, as described in greater detail herein. Accordingly, the user interface device 125 may include at least a display and/or input hardware, as described in greater detail herein. The user interface device 125 may be used to input data into the vehicle floating fleet system 100 and components thereof, such as the network 105. For example, the user interface device 125 may request for a rental vehicle, request to return the rental vehicle, and the like, as discussed in greater detail herein. Further, the user interface device 125 may receive data from the vehicle floating fleet system 100 and components thereof. For example, the user interface device 125 may receive a location of the nearest gated parking facility, a location of a selected vehicle to rent, and the like, as discussed in greater detail herein. As such, the user interface device 125 may contain software programming that relates to determining locations of available vehicles within the vehicle floating fleet system, available gated parking facilities, and the like.

It should be understood that while the user interface device 125 is depicted as a personal electronic device and the server computing device 115 is depicted as a server, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user interface device 125 and the server computing device 115 may represent a plurality of computers, servers, databases, components, and/or the like.

Figure 2:
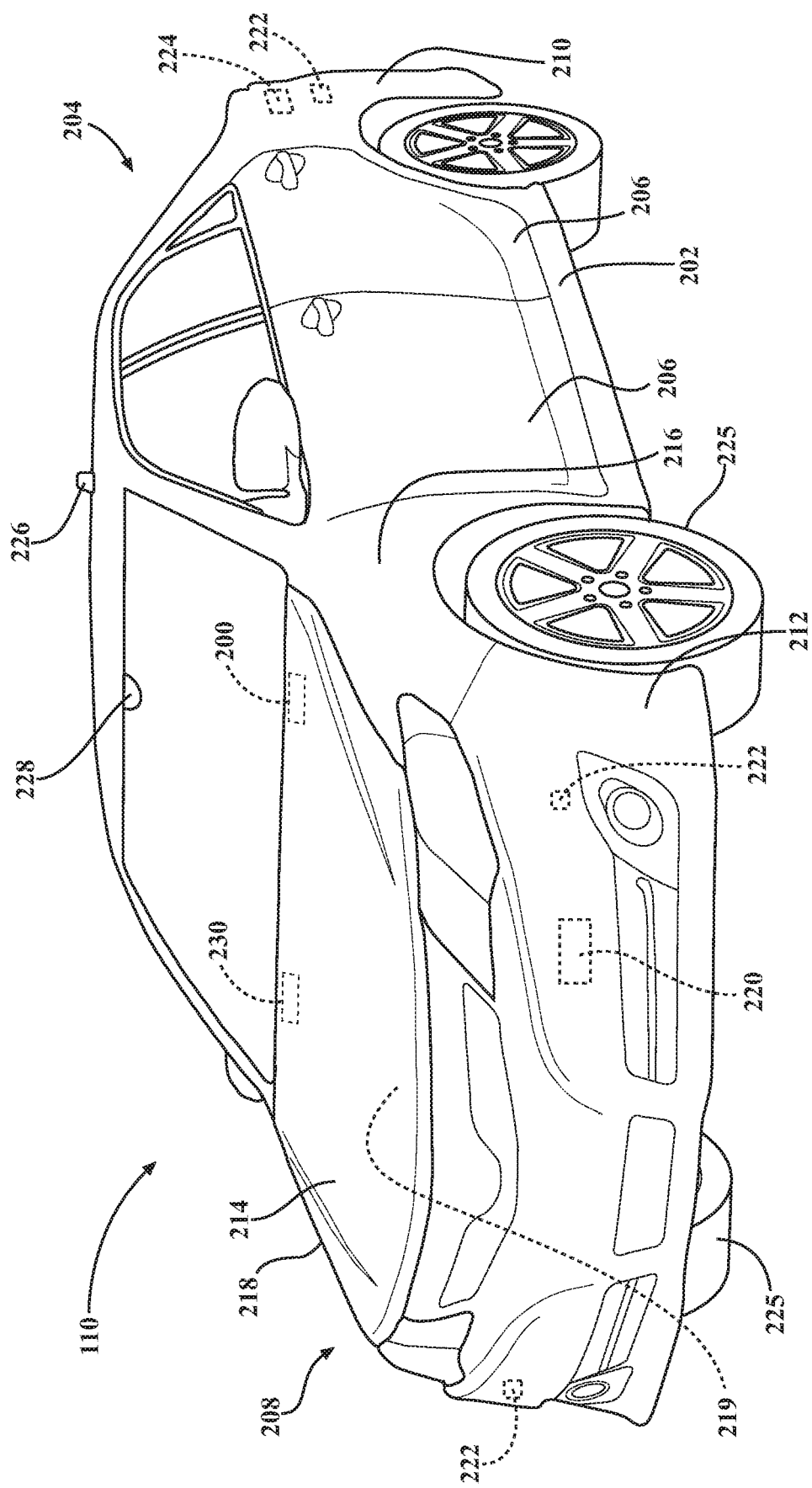
FIG. 2 schematically depicts an illustrative example car-sharing vehicle of the vehicle floating fleet vehicle system of FIG. 1 according to one or more embodiments described and illustrated herein.

Now referring to FIG. 2, the example car-sharing vehicle 110 may be any vehicle with one or more onboard computing devices, particularly computing devices that contain hardware for processing data, storing data, transmitting data, and capturing images in or around the vehicle, and the like. For example, the example car-sharing vehicle 110 may include an on board vehicle electronic control unit 200. As such, the example car-sharing vehicle 110 may be an automobile, motorcycle, bicycle or any other passenger or non-passenger vehicle such as, for example, a terrestrial, aquatic, and/or airborne vehicle. In some embodiments, the example car-sharing vehicle 110 is an autonomous vehicle that navigates its environment with limited human input or without human input.

The example car-sharing vehicle 110 includes a vehicle body 202 onto which a vehicle drivetrain is coupled and at least one wheel and tire 225 is mounted. The example car-sharing vehicle 110 also includes a cabin 204 that is integral with the vehicle body 202. The cabin 204 generally defines a passenger cabin of the example car-sharing vehicle 110, which is enclosed by a plurality of doors 206. The example car-sharing vehicle 110 may include a front end assembly 208 and a rear end assembly 210. The front end assembly 208 may include a front grille assembly 212 and a hood 214 located between a pair of front fenders 216 and 218 and spaces apart the front fenders 216 and 218 so to form an engine compartment 219.

In addition, the front fenders 216 and 218 and/or the front grille assembly 212 may further include a front image capturing device 220 for capturing a plurality of images including live or streaming feeds in real time and/or a plurality of sensors 222 for sensing live vehicle environments such as an environment of the gated parking facility 120 (FIG. 3), as discussed in greater detail herein. Further, the rear end assembly 210 may further include a rear image capturing device 224 for capturing a plurality of images including live or streaming feeds in real time and/or at least one of the plurality of sensors 222 for sensing live vehicle environments such as an environment of the gated parking facility 120 (FIG. 3), as discussed in greater detail herein.

Still referring to FIG. 2, in some embodiments, the example car-sharing vehicle 110 further includes an antenna 226 configured to transmit and receive data, such as transmitting commands to the gated parking facility 120 (FIG. 3), receiving commands from the server computing device 115 (FIG. 1) and/or communication with the user interface device 125 (FIG. 1), as discussed in greater detail herein. The example car-sharing vehicle 110 and/or components thereof may perform one or more computing functions, such as receiving data (e.g. from the antenna 226), capturing data (e.g., from the plurality of sensors 130, with the front image capturing device 128, and/or with the rear image capturing device 132), processing the received and/or captured data, storing the data, and providing processed data for vehicle lockdown operations and/or detections of intrusions, as described in greater detail herein. It should be appreciated that the plurality of sensors 222, the front image capturing device 220, the rear image capturing device 224 and/or the antenna 226 are in communication with an on board vehicle electronic control unit 200.

The example car-sharing vehicle 110 may generally be any vehicle with one or more onboard computing devices, particularly computing devices that contain hardware for processing data, storing data, and capturing images in or around the vehicle. The example car-sharing vehicle 110 and/or components thereof may perform one or more computing functions, such as receiving data (e.g. from the antenna 226), capturing data (e.g., from the plurality of sensors 222, with the front image capturing device 220, and/or with the rear image capturing device 224), processing the received and/or captured data, storing the data, and providing processed data for transmitting a plurality of vehicle data, a location of the vehicle, autonomous vehicle driving, and the like as described in greater detail herein. It should be appreciated that the plurality of sensors 222, the front image capturing device 220, the rear image capturing device 224 and/or the antenna 226 are in communication with the on board vehicle electronic control unit 200.

Still referring to FIG. 2, the example car-sharing vehicle 110 further includes a vehicle communication module 228 that is communicatively coupled to the antenna 226 (and to the network 105) and the onboard vehicle electronic control unit 200. In some embodiments, the vehicle communication module 228 may be an onboard vehicle device. In other embodiments, the vehicle communication module 228 may be a smart mobile device such as a smart phone, a laptop, a tablet, or a like portable handheld smart device. In other embodiments the vehicle communication module 228 may be a wearable device such as a watch, smart glasses, and the like. The vehicle communication module 228 is configured to receive and transmit information and data to a user, via the user interface device 125 (FIG. 1) and to transmit a plurality of instructions to the gated parking facility 120 (FIG. 3), as discussed in greater detail herein.

As a non-limiting example, the vehicle communication module 228 within each example car-sharing vehicle 110 is a wireless area network (WAN) communication module and, in particular, a LoRaWAN communication module, an Ultra-wide Band communication module, and/or a Bluetooth communication module. It should be appreciated that the gated parking facilities 120 (FIG. 3) are known to negatively affect cellular and Wi-Fi wireless communication because of their concrete and metal construction. LoRaWAN due to its long range and ability to provide communication in difficult environments, may be a good choice for wireless communication protocol between the example car-sharing vehicle 110 of the vehicle floating fleet system 100 and the gated parking facility 120 (FIG. 3) as well as other wireless communication devices provided within the gated parking facility 120 (FIG. 3).

Other information may also be communicated from the vehicle communication module 228 to the gated parking facility 120 (FIG. 3), such as, without limitation, vehicle identification number, vehicle make and model, and name of floating fleet system operator. Additional description of the communication between the example car-sharing vehicle 110, the gated parking facility 120 (FIG. 3), and the server computing device 115 (FIG. 1) is described in more detail below. As an example, information regarding the communication exchange between the example car-sharing vehicle 110 and the gated parking facility 120 (FIG. 3) is communicated to the server computing device 115 (FIG. 1) over the Internet by the WAN (e.g., LoRaWAN), Bluetooth®, Ultra-wide Band, and the like associated with the gated parking facility 120 (FIG. 3).

Still referring to FIG. 2, the example car-sharing vehicle 110 may further include a global positioning system (GPS) device 230 communicatively coupled to the vehicle communication module 228 and/or the on board vehicle electronic control unit 200. The GPS device 230 may be configured to transmit the location of the example car-sharing vehicle 110 and/or receive the position of other objects relative to the example car-sharing vehicle 110. As such, the location of the example car-sharing vehicle 110 may be transmitted wirelessly using Wi-Fi, Bluetooth® and the like using the antenna 226.

Figure 3:
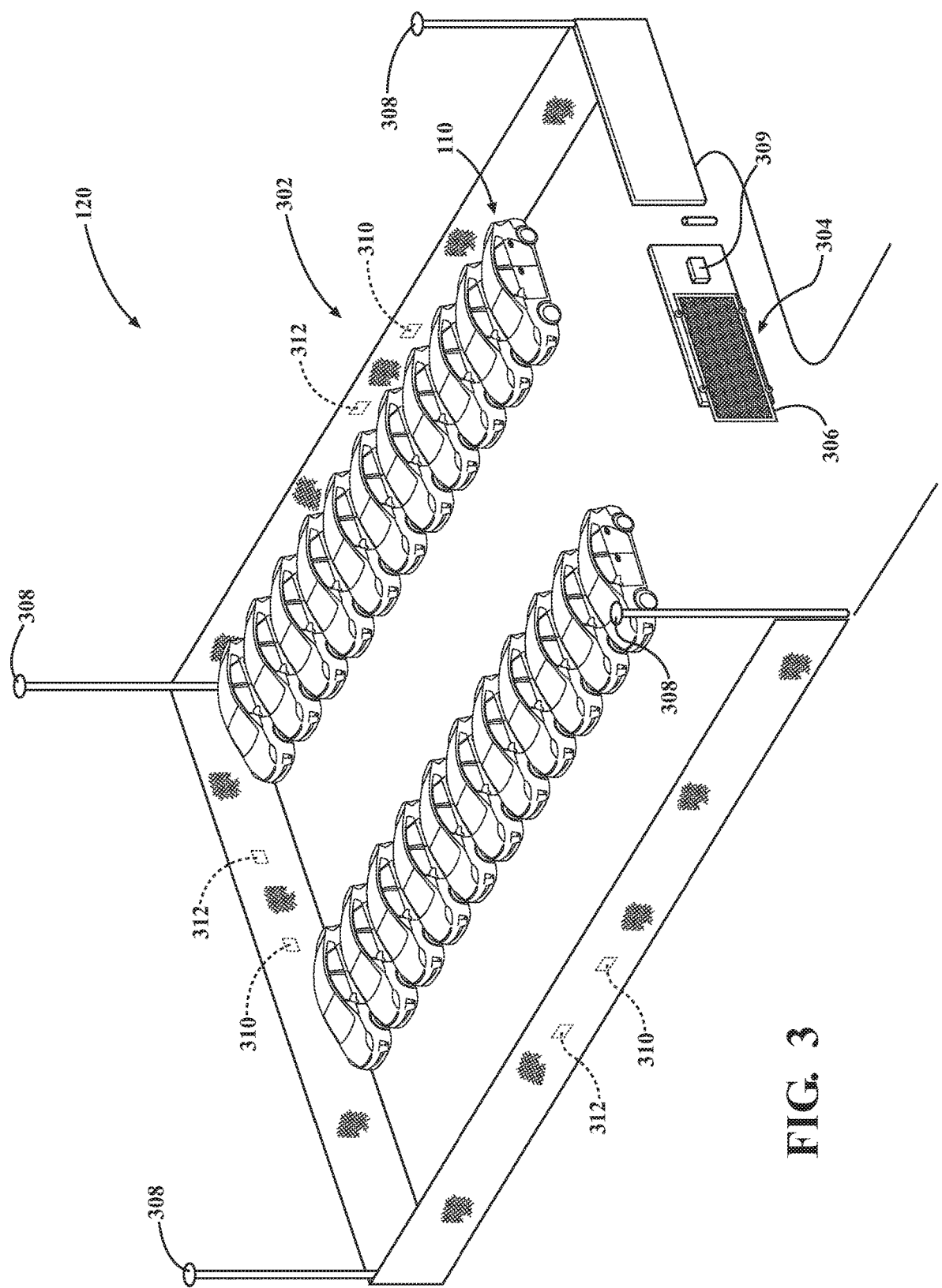
FIG. 3 schematically depicts an illustrative example gated parking facility of the vehicle floating fleet vehicle system of FIG. 1 according to one or more embodiments described and illustrated herein.

Now referring to FIG. 3, the example gated parking facility 120 includes a parking area 302 configured for at least one example car-sharing vehicle 110 and a gate assembly 304. The gate assembly 304 includes a gate 306 and a gated parking facility communication module 309. The gate 306 is configured to move between an open position, as best seen in FIG. 3, and a closed or locked position. It should be appreciated that when the gate 306 is in the open position, the example car-sharing vehicle 110 may enter and/or exit the example gated parking facility 120. On the other hand, when the gate 306 is in the closed position, the example car-sharing vehicle 110 may be inhibited by the gate 306 from entering and/or exiting the example gated parking facility 120.

In an example, the example gated parking facility 120 may be equipped with a plurality of GPS modules 308 and/or Bluetooth® modules 310 positioned within the gated parking facility 120 to provide precise location information regarding the vehicle. That is, the plurality of GPS modules 308 and/or Bluetooth® modules 310 may be in communication with the vehicle communication module 228 (FIG. 2), the server computing device 115 (FIG. 1), the gated parking facility communication module 309, and the like. As such, communication between the example gated parking facility 120 and the example car-sharing vehicle 110 via the plurality of GPS modules 308, the Bluetooth® modules 310, the server computing device 115 (FIG. 1) and/or the gated parking facility communication module 309 may transmit and/or receive data such as data related to tracking the example car-sharing vehicle 110, determining the parking location of the example car-sharing vehicle 110, activating the gate 306, and the like.

Further, the example gated parking facility 120 may be equipped with a plurality of WAN (e.g., LoRaWAN) communication modules 312 for communicating with the vehicle communication module 228 (FIG. 2) of the example car-sharing vehicle 110 and transmitting information and/or data to the server computing device 115 (FIG. 1), the gated parking facility communication module 309, and the like. As such, communication between the example gated parking facility 120 and the example car-sharing vehicle 110 via the plurality of WAN communication modules 312, the server computing device 115 (FIG. 1), and/or the gated parking facility communication module 309 may transmit and/or receive data such as data related to tracking the example car-sharing vehicle 110, determining the parking location of the example car-sharing vehicle 110, activating the gate 306, and the like.

Still referring to FIG. 3, it should be appreciated the example gated parking facility 120 is not limited to the illustrations herein. For example, the example gated parking facility 120 may be a multilevel parking facility in which a plurality of the example car-sharing vehicles 110 are positioned throughout multiple levels of the example gated parking facility 120. In another example, the example gated parking facility 120 may be an underground parking facility in which the plurality of the example car-sharing vehicles 110 are positioned below a surface level.

Figure 4A:
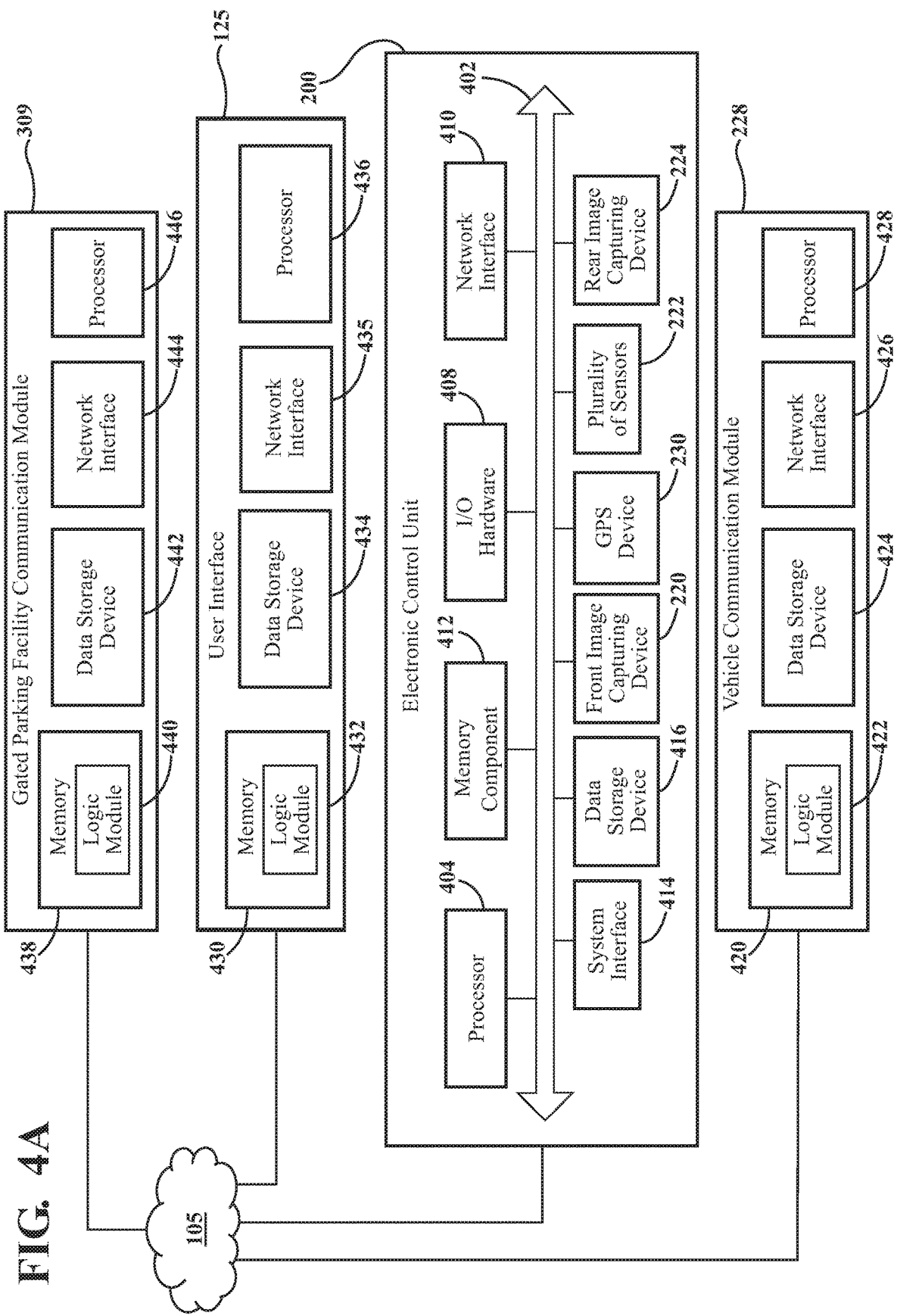
FIG. 4A schematically depicts a block diagram of illustrative components of the computing network for the vehicle floating fleet vehicle system from FIG. 1 according to one or more embodiments shown or described herein.

Now referring to FIG. 4A, various illustrative internal components of the electronic control unit 200, internal components of the vehicle communication module 228, internal components of the user interface device 125, and internal components of the gated parking facility communication module 309 are schematically illustrated. More specifically, the electronic control unit 200 may be communicatively coupled to the communication device 148 via the network 105. The network 105 may include a wide area network (WAN) (e.g., LoRaWAN), such as the Internet, a local area network (LAN), a mobile communications network, a public service telephone network (PSTN), a personal area network (PAN), a metropolitan area network (MAN), a virtual private network (VPN), and/or another network and/or another network that can electronically connected the electronic control unit 200, the communication device 148, the user interface device 125, and the gated parking facility communication module 309 together.

In various embodiments, the vehicle communication module 228 may include, but is not limited to, a memory component 420, a data storage device 424, a network interface 426 and a processor 428. The processor 428, such as a computer processing unit (CPU), may be the central processing unit of the vehicle communication module 228, performing calculations and logic operations to execute a program. The processor 428, alone or in conjunction with the other components, is an illustrative processing device, computing device, processor, or combination thereof. The processor 428 may include any processing component configured to receive and execute instructions (such as from the memory component 420).

Still referring to FIG. 4A in some embodiments, the memory component 420 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 420 may be a non-transitory, processor-readable memory. The memory component 420 may include one or more programming instructions thereon that, when executed by the processor 428, cause the processor 428 to complete various processes, such as one or more of the processes described herein with respect to FIGS. 5-8.

The programming instructions stored on the memory component 420 may be embodied as the one or more software logic modules 422, where each logic module 422 provides programming instructions for completing one or more tasks, as described in greater detail below with respect to FIGS. 5-8. The logic module 422 includes a plurality of different pieces of logic, each of which may be embodied as a computer program, firmware, and/or software/hardware, which may be executable by the processor 428.

The network interface hardware 426 may include any wired or wireless networking hardware, such as a modem, a LAN port, a wireless fidelity (Wi-Fi) card, WiMax card, mobile communications hardware, the antenna 226 (FIG. 2), and/or other hardware for communicating with other networks and/or devices. For example, the network interface hardware 426 may provide a communications link between the example car-sharing vehicle 110 and the other components of a network such as the network 105, satellites, user computing devices, server computing devices, and the like. That is, in embodiments, the network interface hardware 426 is configured to transmit and/or receive signals from the r network 105 and includes one or more conductive elements that interact with electromagnetic signals transmitted by the network 105. The transmitted and/or received signal may be transformed into a data signal indicative of the particular car-sharing platform, whether access is permitted to allow the example car-sharing vehicle to enter and/or exit the example gated parking facility 120 (FIG. 3), and the like.

Still referring to FIG. 4A, in various embodiments, the gated parking facility communication module 309 may include, but is not limited to, a memory component 438, a data storage device 442, a network interface 444 and a processor 446. The processor 446, such as a computer processing unit (CPU), may be the central processing unit of the gated parking facility communication module 309, performing calculations and logic operations to execute a program. The processor 446, alone or in conjunction with the other components, is an illustrative processing device, computing device, processor, or combination thereof. The processor 446 may include any processing component configured to receive and execute instructions (such as from the memory component 438).

Still referring to FIG. 4A in some embodiments, the memory component 438 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 438 may be a non-transitory, processor-readable memory. The memory component 438 may include one or more programming instructions thereon that, when executed by the processor 446, cause the processor 446 to complete various processes, such as one or more of the processes described herein with respect to FIGS. 5-8.

The programming instructions stored on the memory component 438 may be embodied as the one or more software logic modules 440, where each logic module 440 provides programming instructions for completing one or more tasks, as described in greater detail below with respect to FIGS. 5-8. The logic module 440 includes a plurality of different pieces of logic, each of which may be embodied as a computer program, firmware, and/or software/hardware, which may be executable by the processor 446.

The network interface hardware 444 may include any wired or wireless networking hardware, such as a modem, a LAN port, a wireless fidelity (Wi-Fi) card, WiMax card, mobile communications hardware, an antenna, and/or other hardware for communicating with other networks and/or devices. For example, the network interface hardware 444 may provide a communications link between the example car-sharing vehicle 110 and the other components of a network such as the network 105, satellites, user computing devices, server computing devices, and the like. That is, in embodiments, the network interface hardware 444 is configured to transmit and/or receive signals from the network 105 and includes one or more conductive elements that interact with electromagnetic signals transmitted by the network 105. The transmitted and/or received signal may be transformed into a data signal indicative of the particular car-sharing platform, whether access is permitted to allow the example car-sharing vehicle 110 to enter and/or exit the example gated parking facility 120 (FIG. 3), and the like.

Still referring to FIG. 4A, in various embodiments, the user interface device 125 may include, but is not limited to, a memory component 430, a data storage device 434, a network interface 435 and a processor 436. The processor 436, such as a computer processing unit (CPU), may be the central processing unit of the user interface device 125, performing calculations and logic operations to execute a program. The processor 436, alone or in conjunction with the other components, is an illustrative processing device, computing device, processor, or combination thereof. The processor 436 may include any processing component configured to receive and execute instructions (such as from the memory component 430).

Still referring to FIG. 4A in some embodiments, the memory component 430 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 430 may be a non-transitory, processor-readable memory. The memory component 430 may include one or more programming instructions thereon that, when executed by the processor 436, cause the processor 436 to complete various processes, such as one or more of the processes described herein with respect to FIGS. 5-8.

The programming instructions stored on the memory component 430 may be embodied as the one or more software logic modules 432, where each logic module 432 provides programming instructions for completing one or more tasks, as described in greater detail below with respect to FIGS. 5-8. The logic module 432 includes a plurality of different pieces of logic, each of which may be embodied as a computer program, firmware, and/or software/hardware, which may be executable by the processor 436.

For example, users of the vehicle floating fleet system 100 (FIG. 1) may use a software application on the user interface device 125 to register for the service and rent a vehicle. The user may view vehicles within close proximity to his or her current location or some other location. As an example, graphical representations of the vehicles may appear on a map. The user may then select a vehicle to rent and then agree to certain terms and conditions of the rental, as described in greater detail herein. In some embodiments, a mobile application may provide step-by-step walking instructions to assist the user in locating the vehicle. The precise location of the vehicle is known by use of the GPS device 230, as well as the network interface 426 of the vehicle communication module 228, as described in greater detail herein.

The network interface hardware 435 may include any wired or wireless networking hardware, such as a modem, a LAN port, a wireless fidelity (Wi-Fi) card, WiMax card, mobile communications hardware, the antenna 226 (FIG. 2), and/or other hardware for communicating with other networks and/or devices. For example, the network interface hardware 435 may provide a communications link between the example car-sharing vehicle 110 and the other components of a network such as the network 105, satellites, user computing devices, server computing devices, and the like. That is, in embodiments, the network interface hardware 435 is configured to transmit and/or receive signals from the network 105 and includes one or more conductive elements that interact with electromagnetic signals transmitted by the network 105. The transmitted and/or received signal may be transformed into a data signal indicative of the particular car-sharing platform, to request a gated parking facility 120 (FIG. 3) to return and/or rent the example car-sharing vehicle 110, whether access is permitted to allow the example car-sharing vehicle 110 to enter and/or exit the example gated parking facility 120 (FIG. 3), and the like.

Still referring to FIG. 4A, the electronic control unit 200 includes a non-transitory computer-readable medium that stories computer-readable programming instructions for completing the various processes described herein, embodied as hardware, software, and/or firmware, according to embodiments shown and described herein. While in some embodiments the electronic control unit 200 may be configured as a general purpose computer with the requisite hardware, software, and/or firmware, in other embodiments, the electronic control unit 200 may also be configured as a special purpose computer designed specifically for performing the functionality described herein. For example, the electronic control unit 200 may be a device that is particularly adapted to communicate with the vehicle communication module such that the example car-sharing vehicle 110 may enter and exit a plurality of example gated parking facilities 120 and/or transmit a plurality of vehicle information and/or rental information that is customizable by the car-sharing company. In another example, the example car-sharing vehicle 110 is monitored during the parking of the example car-sharing vehicle 110 to inform future rentals of the example car-sharing vehicle 110 the exact parking location. In another example, the electronic control unit 200 of the example car-sharing vehicle 110 may be a device that is particularly adapted to control and/or navigate the example car-sharing vehicle 110 in an autonomous mode through the example gated parking facility 120 such that the example car-sharing vehicle 110 may be picked up at the gate 306 (FIG. 3) and/or such that the example car-sharing vehicle 110 is autonomously parked within the example gated parking facility 120. In embodiments where the electronic control unit 200 is a general purpose computer, the systems and methods described herein provide a mechanism for improving vehicle car-sharing services by permitting users to rent from and/or drop off the example car-sharing vehicle 110 at any participating gated parking facility and then informing the car-sharing operator of the location of the example car-sharing vehicle and current vehicle information such that the current user may be charged appropriately for the rental and such that future users know of the exact location of the example car-sharing vehicle 110.

Still referring to FIG. 4A, the electronic control unit 200 may generally be an onboard vehicle computing system. In some embodiments, the electronic control unit 200 may be a plurality of vehicle computing systems. As also illustrated in FIG. 4A, the electronic control unit 200 may include a processor 404, I/O hardware 408, network interface hardware 410, a non-transitory memory component 412, a system interface 414, a data storage device 416, the plurality of sensors 222, the front image capturing device 220, the rear image capturing device 224, and the GPS device 230. A local interface 402, such as a bus or the like, may interconnect the various components.

It should be understood that the local interface 402 may be formed from any medium that is capable of transmitting a signal such as, for example, conductive wires, conductive traces, optical waveguides, or the like. In some embodiments, the local interface 402 may facilitate the transmission of wireless signals, such as Wi-Fi, Bluetooth, Near Field Communication (NFC) and the like. Further, it should be appreciated that the local interface 402 may communicatively couple the vehicle communication module 228 to the electronic control unit 200. Moreover, the local interface 402 may be formed from a combination of mediums capable of transmitting signals. In one embodiment, the local interface 402 comprises a combination of conductive traces, conductive wires, connectors, and buses that cooperate to permit the transmission of electrical data signals to components such as processors, memories, sensors, input devices, output devices, and communication devices. Accordingly, the local interface 402 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The processor 404, such as a computer processing unit (CPU), may be the central processing unit of the electronic control unit 200, performing calculations and logic operations to execute a program. The processor 404, alone or in conjunction with the other components, is an illustrative processing device, computing device, processor, or combination thereof. The processor 404 may include any processing component configured to receive and execute instructions (such as from the data storage device 416 and/or the memory component 412).

The memory component 412 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 412 may include one or more programming instructions thereon that, when executed by the processor 404, cause the processor 404 to complete various processes, such as the processes described herein with respect to FIGS. 5-8. Still referring to FIG. 4A, the programming instructions stored on the memory component 412 may be embodied as a plurality of software logic modules, where each logic module provides programming instructions for completing one or more tasks, as described in greater detail below with respect to FIG. 4B.

The network interface hardware 410 may include any wired or wireless networking hardware, such as a modem, WNA (e.g., LoRaWAN), a LAN port, a wireless fidelity (Wi-Fi) card, WiMax card, mobile communications hardware, Bluetooth®, the antenna 226 (FIG. 2), and/or other hardware for communicating with other networks and/or devices. For example, the network interface hardware 410 may provide a communications link between the example car-sharing vehicle 110 and the other components of a network such as a network 105, satellites, user computing devices, server computing devices, and the like. That is, in embodiments, the network interface hardware 410 is configured to receive signals from the network 105 and/or the vehicle communication module 228 and includes one or more conductive elements that interact with electromagnetic signals transmitted by the network 105 and/or the vehicle communication module 228. The received signal is transformed into a data signal indicative of the commend from the user interface device 125 (FIG. 1), from the server computing device 115, and the like, via the vehicle communication module 228, such as the requested pickup instructions (e.g., whether the user will pick the example car-sharing vehicle 110 (FIG. 2) up at the gate 306 (FIG. 3) and/or at the current parking spot). Thus, the network interface hardware 410 allows the example car-sharing vehicle 110 (FIG. 2) to have customized rental options from the user and/or car-sharing company, who is remotely located with respect to the example car-sharing vehicle 110 (FIG. 2).

Still referring to FIG. 4A, the data storage device 416, which may generally be a storage medium, may contain one or more data repositories for storing data that is received and/or generated. The data storage device 416 may be any physical storage medium, including, but not limited to, a hard disk drive (HDD), memory, removable storage, and/or the like. While the data storage device 416 is depicted as a local device, it should be understood that the data storage device 416 may be a remote storage device, such as, for example, a server computing device or the like. Illustrative data that may be contained within the data storage device 416 is described below with respect to FIG. 4C. It should be appreciated that the amount of available storage space in the data storage device 416 may be limited due to its location in the electronic control unit 200 in some embodiments. As such, it may be necessary to minimize the size of the data stored thereon, as described in greater detail herein.

Still referring to FIG. 4A, the I/O hardware 408 may communicate information between the local interface 402 and one or more other components of the example car-sharing vehicle 110 (FIG. 2). For example, the I/O hardware 408 may act as an interface between the electronic control unit 200 and other components, such as the plurality of sensors 222, the vehicle communication module 228, a head end unit, navigation systems, meter units, infotainment systems, and/or the like. In some embodiments, the I/O hardware 408 may be utilized to transmit one or more commands to the other components of the example car-sharing vehicle 110 (FIG. 2).

The system interface 414 may generally provide the electronic control unit 200 with an ability to interface with one or more external devices such as, for example, the vehicle communication module 228, the user interface device 125 (FIG. 1), the server computing device 115 (FIG. 1), and the like, such that the electronic control unit 200 may receive information and/or data from the vehicle communication module 228, the user interface device 125 (FIG. 1), the server computing device 115 (FIG. 1) and push data and/or information to the vehicle communication module 228, the user interface device 125 (FIG. 1), the server computing device 115 (FIG. 1). As such, the system interface 414 permits bidirectional communication between the electronic control unit 200 and the vehicle communication module 228, the user interface device 125 (FIG. 1), the server computing device 115 (FIG. 1).

Still referring to FIG. 4A, the plurality of sensors 222 may be communicatively coupled to the local interface 402 and communicatively coupled to the processor 404 via the local interface 402. The plurality of sensors 222 may be any sensing device, sensor, or detector that is suitable for obtaining or collecting data. Any suitable commercially available plurality of sensors 222 may be used without departing from the scope of the present disclosure. In some embodiments, the plurality of sensors 222 may be coupled to one or more other components that provide additional functionality for sensing, such as, for example, an image capturing device that captures images, whether still or video (a sequence of dynamic photos).

The GPS device 230 may be communicatively coupled to the local interface 402 and communicatively coupled to the processor 404 via the local interface 402. The GPS device 230 may be any sensing device, sensor, or detector that is suitable for obtaining or collecting data. For Example, the GPS device 230 may determine the parking position of the car-sharing vehicle 110 (FIG. 2), a dynamically changing current location of the car-sharing vehicle 110 (FIG. 2) (e.g. when moving), identifying gated parking facilities nearby the current location of the car-sharing, and the like. Any suitable commercially available GPS device 230 may be used without departing from the scope of the present disclosure. In some embodiments, the GPS device 230 may be coupled to one or more other components that provide additional functionality for determining the position, such as the antenna 226 (FIG. 2).

The front image capturing device 220 may be communicatively coupled to the local interface 402 and coupled to the processor 404 via the local interface 402. The front image capturing device 220 may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available front image capturing device 220 may be used without departing from the scope of the present disclosure. In some embodiments, the front image capturing device 220 may be coupled to one or more other components that provide additional functionality for imaging, such as, for example, one or more sensors.

The front image capturing device 220 may include or may be coupled to a lens (not shown). The lens is not limited by this disclosure and may generally be any optical component that is configured to focus the light entering the front image capturing device 220 such that an image can be properly obtained. In some embodiments, the lens may be a fixed lens that is not adjustable. In other embodiments, the lens may be adjustable, either manually or automatically by the processor 404, to zoom in on an object, zoom out on an object, and/or adjust the focus of the light entering the front image capturing device 220.

The rear image capturing device 224 may be communicatively coupled to the local interface 402 and coupled to the processor 404 via the local interface 402. The rear image capturing device 224 may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available rear image capturing device 224 may be used without departing from the scope of the present disclosure. In some embodiments, the rear image capturing device 224 may be coupled to one or more other components that provide additional functionality for imaging, such as, for example, one or more sensors.

The rear image capturing device 224 may include or may be coupled to a lens (not shown). The lens is not limited by this disclosure and may generally be any optical component that is configured to focus the light entering the rear image capturing device 224 such that an image can be properly obtained. In some embodiments, the lens may be a fixed lens that is not adjustable. In other embodiments, the lens may be adjustable, either manually or automatically by the processor 404, to zoom in on an object, zoom out on an object, and/or adjust the focus of the light entering the rear image capturing device 224.

Figure 4B:
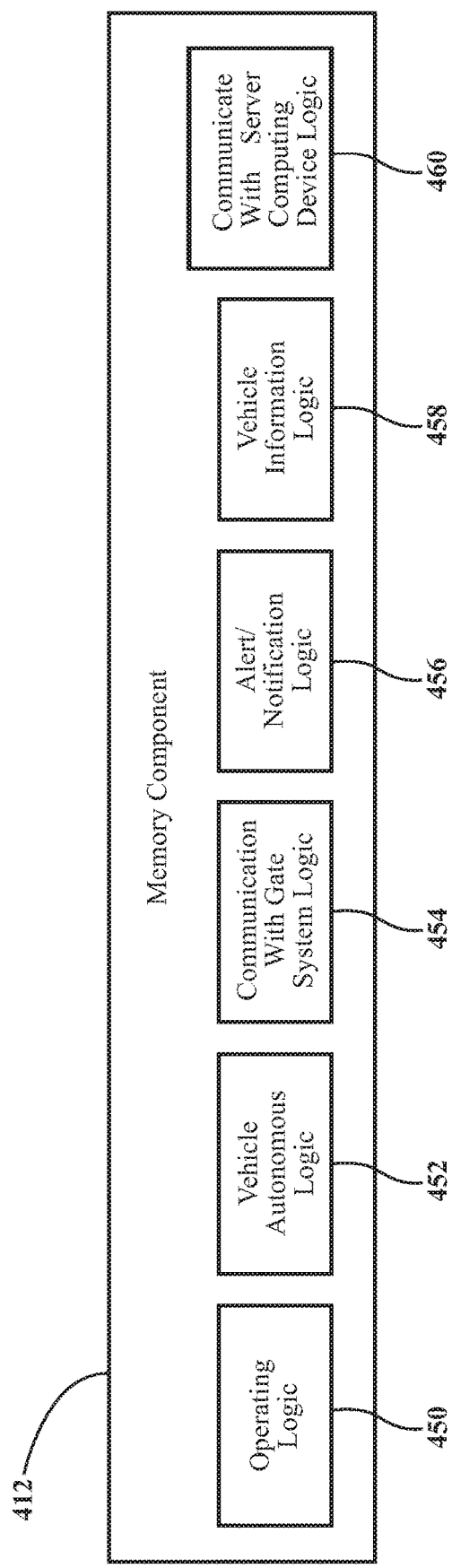
FIG. 4B schematically depicts an illustrative memory component containing illustrative logic components according to one or more embodiments shown and described herein.

With reference to FIG. 4B, in some embodiments, the program instructions contained on the memory component 412 may be embodied as a plurality of software modules, where each module provides programming instructions, machine readable and executable instructions, and/or the like, for completing one or more tasks. The programming instructions, machine readable and executable instructions, and the like may comprise logic or algorithm(s) written in any programming language of any generation (e.g., 1GL, 2GL, 3GL, 4GL, or 5GL) such as, for example, machine language that may be directly executed by the processor 404, or assembly language, object-oriented programming (OOP), scripting languages, microcode, and the like, that may be compiled or assembled into machine readable and executable instructions and stored on the one or more memory component 412. Alternatively, the programming instructions, machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

For example, FIG. 4B schematically depicts the memory component 412 containing illustrative logic components according to one or more embodiments shown and described herein. As shown in FIG. 4B, the memory component 412 may be configured to store various processing logic, such as, for example, an operating logic 450, a vehicle autonomous logic 452, a communication with gate systems logic 454, an alert/notification logic 456, a vehicle information logic 458 and/or a communication with the server computing device logic 460 (each of which may be embodied as a computer program, firmware, or hardware, as an example).

Still referring to FIG. 4B, the operating logic 450 may include an operating system and/or other software for managing components of the electronic control unit 200 (FIG. 4A). Further, the operating logic 450 may contain one or more software modules for monitoring data, transmitting data, and/or analyzing data. The vehicle autonomous logic 452 may contain one or more software modules and/or other software for managing components of the electronic control unit 200 such as monitoring data, transmitting data, analyzing data, collecting data and/or navigating the example car-sharing vehicle 110 within the example gated parking facility 120 (FIG. 3). For example, the vehicle autonomous logic 452 may navigate the example car-sharing vehicle 110 within the example gated parking facility 120 (FIG. 3) from the gate 306 (FIG. 3) to a designated parking spot and/or from the designated parking spot to the gate 306 (FIG. 3) to pick up the user.

The vehicle autonomous logic 452 may collect data from one or more sources (e.g. the plurality of sensors 222, the front image capturing device 220, the rear image capturing device 224, and the GPS device 230 depicted in FIG. 2, and/or the like), as described in greater detail herein. As such, the vehicle autonomous logic 452 may be initiated when the request for the example car-sharing vehicle is selected by the user and/or when the return of the example car-sharing vehicle is selected by the user. As such, the vehicle autonomous logic 452 may assist in activating the front image capturing device 220, the rear image capturing device 224, the GPS device 230, the plurality of sensors 222, and the like.

The communication with gate systems logic 454 may contain one or more software modules for receiving data, monitoring data, transmitting data, and/or analyzing data to provide the vehicle communication module 228 (FIG. 2) and the gated parking facility communication module 309 (FIG. 3) as well as other components (e.g., the head unit, infotainment system, user interface device 125 (FIG. 1) and the like) with the plurality of instructions. It should be appreciated that the plurality of instructions may be related to whether the example car-sharing vehicle 110 is permitted to enter and/or exit the example gated parking facility 120 (FIG. 3). The communication with gate systems logic 454 may be initiated based on a predetermined range or distance from the gated parking facility communication module 309 (FIG. 3) and/or may communicate with the gated parking facility communication module 309 (FIG. 3) using the antenna 226 (FIG. 2), the vehicle communication module 228 (FIG. 2), the plurality of GPS modules 308 (FIG. 3), Bluetooth® modules 310 (FIG. 3), and/or the WAN communication modules 312 (FIG. 3) positioned within the gated parking facility 120 (FIG. 3).

It should be understood that because the example car-sharing vehicle 110 (FIG. 2) may be parked in any example gated parking facility 120 (FIG. 3), the communication with gate systems logic 454 is configured to universally communicate with any gate system. In some embodiments, participating gated parking facilities install a proprietary and dedicated gate communication module that is operable to communicate with the vehicle communication module 228 (FIG. 2) of the vehicles in the vehicle floating fleet system using the communication with gate systems logic 454. In other embodiments, the vehicle communication modules 228 (FIG. 2) of the vehicles in the vehicle floating fleet system are adapted to communicate with many different types of gate systems using the communication with gate systems logic 454.

The alert/notification logic 456 may contain one or more software modules for receiving data, monitoring data, transmitting data, and/or analyzing data to provide the user interface device 125 (FIG. 1) with the alerts/notifications of the current parking location of the example car-sharing vehicle 110 (FIG. 2) and the example gated parking facility 120 (FIG. 3) where the vehicle is located, and the like. Further, the alert/notification logic 236 may provide third parties, such as car-sharing companies, owners of the gated parking facility, insurance companies, law enforcement, and the like, with the current parking location of the example car-sharing vehicle 110 (FIG. 2). In some embodiments, the alert/notification logic 236 may provide the user with the terms and conditions of the lease to be electronically accepted (e.g., agreed to and/or signed by the user). It should be appreciated that the alert/notification may be a SMS message, a ring, a graphic such as a map, a terms and conditions documents, a waiver documents, and the like, that is pushed to the user interface device 125 (FIG. 1), the server computing device 115 (FIG. 1) and/or the like.

The vehicle information logic 458 may contain one or more software modules for receiving data, monitoring data, transmitting data, and/or analyzing data to provide the user interface device 125 (FIG. 1), the vehicle communication module 228 (FIG. 2), the server computing device 115 (FIG. 1) and/or the gate communication module with respect to a plurality of vehicle parameters. For example, the plurality of vehicle parameters may include a fuel level, miles driven, driving time, speed, number of occupants, vehicle health, and the like.

The communication with the server computing device logic 460 may contain one or more software modules for receiving data, monitoring data, transmitting data, and/or analyzing data to provide between the vehicle communication module 228 (FIG. 2) and the server computing device 115 (FIG. 1) as well as other components (e.g., the head unit, infotainment system, user interface device 125 (FIG. 1) and the like) with the plurality of instructions. It should be appreciated that the plurality of instructions may be related to the plurality of vehicle parameters of the example car-sharing vehicle 110 (FIG. 2), the location of the example car-sharing vehicle 110 (FIG. 2), whether the user is renting and/or returning the example car-sharing vehicle 110 (FIG. 2), terms and conditions of the rental, gated parking facility information, information and/or data related to the car-sharing company, and/or the like.

In one example, the server computing device logic 460 is executed such that a parking reservation operator enables users to reserve and pay for parking prior to arriving at the parking facility. In this example, example gated parking facilities 120 (FIG. 3), using the information communicated between the example car-sharing vehicle 110 (FIG. 1) and the example gated parking facility 120 (FIG. 3), transmits information regarding which example car-sharing vehicles entered and exited the example gated parking facilities 120 (FIG. 3) and at what day and time. The parking reservation operator may monitor how long each of the example car sharing vehicles were parked in the gated parking facility and pays the gated parking facilities directly. Additionally, the parking reservation operator may automatically generate invoices that are sent to one or more floating fleet system operators for the time the example car-sharing vehicles 110 (FIG. 2) were parked in the example gated parking facilities 120 (FIG. 3).

In another example, the server computing device logic 460 is executed such that the rate of the example car-sharing vehicle 110 (FIG. 2) is based on time used or duration of the rental. That is, because the example car-sharing vehicle 110 (FIG. 2) may be rented from a gated parking facility at Location A, which is operated by Parking Company A, and returned to a different gated parking facility, Locations B, which is operated by Parking Company B. In a non-limiting example, both the Location A gated parking facility and the Location B gated parking facility may be in the same neighborhood, same town or same city. In another example, they are located in different areas, states and/or countries. The server computing device logic 460 may network the competing companies together and handle the location of the example car-sharing vehicle, the navigation to the facilities, the amount owed for the rental, and the like.

The communication between the example car-sharing vehicle 110 (FIG. 2) and the server computing device 115 (FIG. 1) may be initiated based on using the antenna 226 (FIG. 2), the vehicle communication module 228 (FIG. 2), the plurality of GPS modules 308 (FIG. 3), Bluetooth® modules 310 (FIG. 3), and/or the WAN communication modules 312(FIG. 3) positioned within the example gated parking facility 120 (FIG. 3).

Figure 4C:
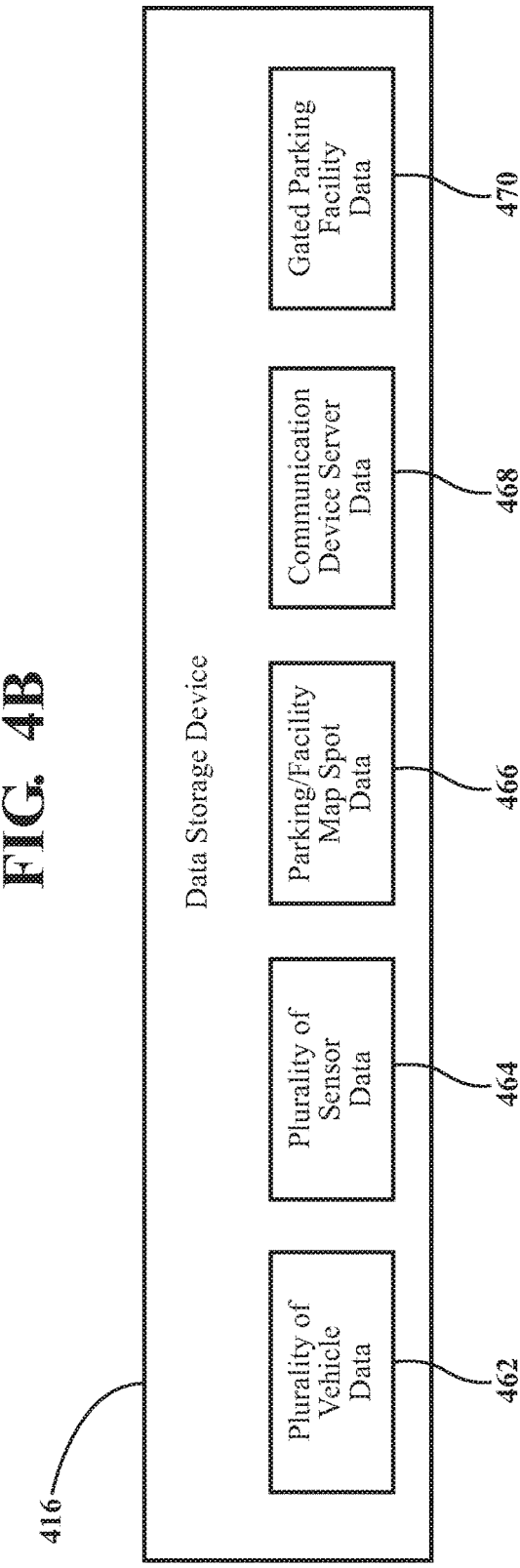
FIG. 4C schematically depicts an illustrative data storage device containing illustrative data components according to one or more embodiments shown and described herein.

FIG. 4C schematically depicts a block diagram of various data contained within a storage device (e.g., the data storage device 416). As shown in FIG. 4C, the data storage device 416 may include, for example, a plurality of vehicle data 462 that may be preprogrammed such as by the manufacturer, at the factory, and the like, and/or may be customizable for each vehicle type. The plurality of vehicle data 462 may be identified from data received from a plurality of vehicle components, and the like. For example, the fuel level, miles driven, driving time, speed, number of occupants, vehicle health, and the like may be identified from the data received from each of the vehicle components. Further, the plurality of vehicle data 462 may also include a vehicle identification number, vehicle make and model, name of floating fleet system operator, and/or the like.

The data storage device 416 may further include, for example, a plurality of sensor data 464. The data captured from the front image capturing device 220 (FIG. 2), the rear image capturing device 224 (FIG. 2), the GPS device 230 (FIG. 2) and/or the plurality of sensors 222 (FIG. 2) may be stored as the plurality of sensor data 464. It should be appreciated that while the data captured from the front image capturing device 220 (FIG. 2), the rear image capturing device 224 (FIG. 2), the GPS device 230 (FIG. 2) and/or the plurality of sensors 222 (FIG. 2) may be recorded as the plurality of sensor data 464, the data may be live streamed to the user interface device 125 (FIG. 1), the vehicle communication module 228 (FIG. 2), the server computing device 115 (FIG. 1) and/or the example gated parking facility 120 (FIG. 3), as discussed in greater detail herein. Further, the plurality of sensor data 464 may be used during autonomous driving of the example car-sharing vehicle 110 (FIG. 2). As such, it should be appreciated that the plurality of sensor data 464 may not be stored permanently, but instead may be stored temporarily such that the data may be extracted therefrom. It should also be appreciated that any image processing technology may be used to process images from the front image capturing device 220 (FIG. 2), the rear image capturing device 224 (FIG. 2), the GPS device 230 (FIG. 2), and/or the plurality of sensors 222 (FIG. 2).

The data storage device 416 may further include, for example, a plurality of parking/facility map data in which the user may be guided to either the example car-sharing vehicle 110 (FIG. 2) within the example gated parking facility 120 (FIG. 3), to a nearest gated parking facility 120 (FIG. 3) to return the example car-sharing vehicle 110 (FIG. 2), the precise location of each of the example car-sharing vehicles 110 (FIG. 2) so that the operator of the vehicle floating fleet system can determine the location of each vehicle in the fleet, and/or the like.

Further, the data storage device 416 may further include, for example, a plurality of server computing data 468 that may include information provided by various operators of the vehicle floating fleet system depending on the selected example car-sharing vehicle 110 (FIG. 2). For example, the server computing data 468 may contain data related to the signed rental terms and agreements, what time the vehicle left the example gated parking facility 120 (FIG. 3), the rental duration, whether the vehicle was picked up in autonomous mode or normal mode, and/or the like. Further, the server computing data 468 may contain data related to the type of vehicle communication module 228 (FIG. 2), the type of user interface device 125 (FIG. 1), the specific gated parking garage sensors (e.g. the plurality of GPS modules 308, Bluetooth® modules 310, and/or the WAN communication modules 312 (of FIG. 3)) positioned within the example gated parking facility 120 (FIG. 3).

The server computing data 468 may contain data related to the connectivity of the user interface device 125 (FIG. 1) such as the type of the display such as whether the display is an optical output such as, for example, a cathode ray tube, a light emitting diode (LED) display, an organic light emitting diode (OLED) display, a liquid crystal display, a plasma display, and/or the like and may include information relating to the operating system of the user interface device 125 (FIG. 1), the type of device, and the like, such that the plurality of alerts/notifications, rental agreements, locations, and the like may be pushed to the user interface device 125 (FIG. 1).

The data storage device 416 may further include, for example, a plurality of gated parking facility data 470 such as the number of available parking spots, the layout and/or design of the example gated parking facility 120 (FIG. 3) (e.g. a flat lot, a garage with a plurality of floors, whether underground, entrance and exit ramps, gate locations, and/or the like).

It should be understood that the components illustrated in FIGS. 4A-4C are merely illustrative and are not intended to limit the scope of this disclosure. More specifically, while the components in FIGS. 4A-4C are illustrated as residing within the electronic control unit 200, the vehicle communication module 228, the user interface device 125 and/or the gated parking facility communication module 309, this is a non-limiting example. In some embodiments, one or more of the components may reside external to the electronic control unit 200, the vehicle communication module 228, the user interface device 125 and/or the gated parking facility communication module 309.

As mentioned above, the various components described with respect to FIGS. 4A-4C may be used to carry out one or more processes for vehicle floating fleet system that enable a user to pick up a rented vehicle at any gated parking facility and drop of the rented vehicle at any gated parking facility without being required to take any action. Further, the various components described with respect to FIGS. 4A-4C may be used to enable a gated parking facility to be automatically paid for the parking of the rented vehicle in the gated parking facility.

Figure 5:
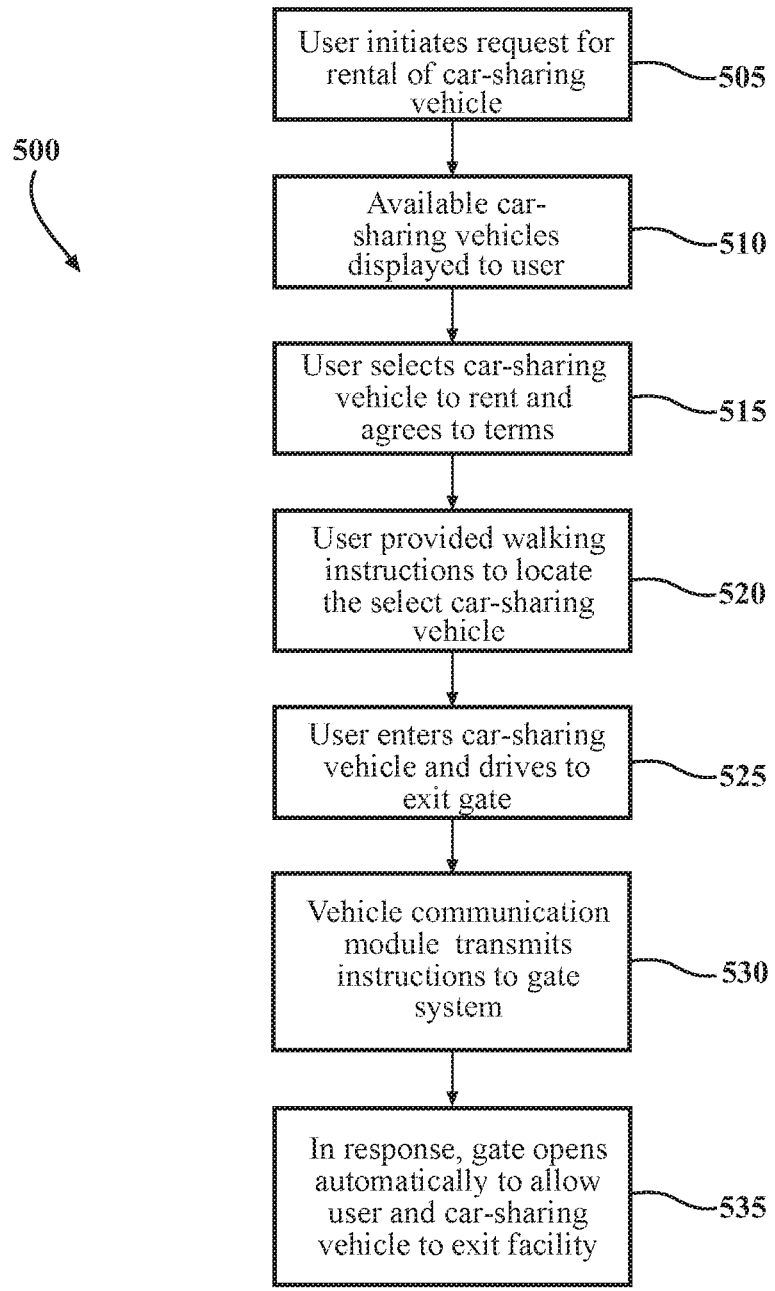
FIG. 5 depicts a flowchart of an illustrative method of a user initiating a human request for a rental of the example car-sharing vehicle according to one or more embodiments shown and described herein.

Now referring to FIG. 5, a flowchart of an illustrative method 500 of requesting to rent the car-sharing vehicle is schematically depicted. In some embodiments, the vehicle communication module, the electronic control unit, the user interface, the server computing device, and the gate parking facility communication module may all be in continuous communication to execute the various steps depicted in FIG. 5. The various components may monitor for a user input that corresponds to an initiation for the rental request, such as the user initiates a request via the user interface, at block 505. In a non-limiting example, the user may use a software application on the user interface to initiate the request for the rental of the car-sharing vehicle. Once the input is received, the server computing device (which may be controlled by the operator of the floating fleet service) determines a location of the user and finds one or more car sharing vehicles that may be of interest to the user. As a non-limiting example, the user interface device (e.g., a smartphone) may share location information regarding the user's location. The server computing device may then scan a vehicle inventory (e.g., the plurality of vehicle data 462 illustrated in FIG. 4C) to find the nearest car-sharing vehicles to the user's location. As stated above, information regarding the car-sharing vehicles of the floating fleet is stored and accessible to the server computing device. Information may include, but is not limited to, vehicle make, vehicle model, vehicle trim level, vehicle style, vehicle mileage, present vehicle location, and the like.

Car-sharing vehicles within a certain radius of the user are found. In some embodiments, the user may select a radius (e.g., within 0.5 km, 1 km, within 2 km, within 5 km, and the like) in which to locate car-sharing vehicles. In some embodiments, once the nearby car-sharing vehicles are located, the nearby car-sharing vehicles may be further filtered by user preference. For example, a user may use the software application to set vehicle preferences, such as model, make, style, and the like. Nearby car-sharing vehicles not meeting the preferences may be filtered out. In other embodiments, the software application does not enable selection of user preferences.

Next, the available car-sharing vehicles at various gated parking facilities are displayed on the user interface device at block 510. The gated parking facilities may be operated by different operators, and are not under control of the floating fleet service provider. For example a floating fleet service provider may have car-sharing vehicles parked at a first garage operated by garage owner A, a second garage operated by garage owner B, and the like. The ability to park car-sharing vehicles as any gated parking facility vastly improves the ability for a user to find a car-sharing vehicle that is close by.

At block 515, the user selects the car-sharing vehicle and agrees to the terms of the rental policy. In embodiments, the server computing device removes the selected car-sharing vehicle from the list of available car-sharing vehicles to prevent others from renting the car sharing vehicle.

Once the terms are agreed and the car-sharing vehicle is selected, in some embodiments, the user is provided with step-by-step walking instructions to locate the car-sharing vehicle, at block 520. In other embodiments, the user travels to the selected car-sharing vehicle via other methods other than walking. In yet other embodiments, no directions are provided to get to the selected car-sharing vehicle.

The user enters the car-sharing vehicle and proceeds to drive the car-sharing vehicle to the gate of the gated parking facility, at block 525. The vehicle communication module transmits instructions to the gated parking facility communication module, at block 530, which causes the gated parking facility communication module to communicate with the gate of the gated parking facility to automatically open such that the user and the car-sharing vehicle may exit the gated parking facility, at block 535. The instruction may be sent by any wireless communication protocol, such as Bluetooth®, WAN, LoRaWAN, and the like. The gate system receives the instruction from the vehicle communication module and opens the gate such that the user is not required to take any action to open the gate. In embodiments, the protocol to open the gate does not require a connection to the Internet but rather, it is negotiated locally between the vehicle communication module and the gate system.

It should be understood that a plurality of floating fleet operators may have a plurality of car-sharing vehicles stored in the gated parking facility. When the vehicle communication module and the car-sharing vehicle exits the gated parking facility, the costs that the floating fleet operator of the car-sharing vehicle associated with storing the car-sharing vehicle are calculated and sent to the server computing device to bill the floating fleet operator the amount owed to the gated parking facility. As such, this occurs independent of the user and the user does not have to worry about paying any storage fees when leaving the gated parking facility.

It should be appreciated each car-sharing vehicle within the vehicle floating fleet system has the vehicle communication module that is configured to communicate with the gated parking facility communication module of the gate system of the gated parking facility. Because the car-sharing vehicle may be parked in any gated parking facility, the vehicle communication module is configured to universally communicate with any gate system. In some embodiments, participating gated parking facilities install a proprietary and dedicated gated parking facility communication module that is operable to communicate with the vehicle communication module of the car-sharing vehicles in the vehicle floating fleet system. In other embodiments, the vehicle communication module of the car-sharing vehicle in the vehicle floating fleet system are adapted to communicate with many different types of gate systems.

Figure 6:
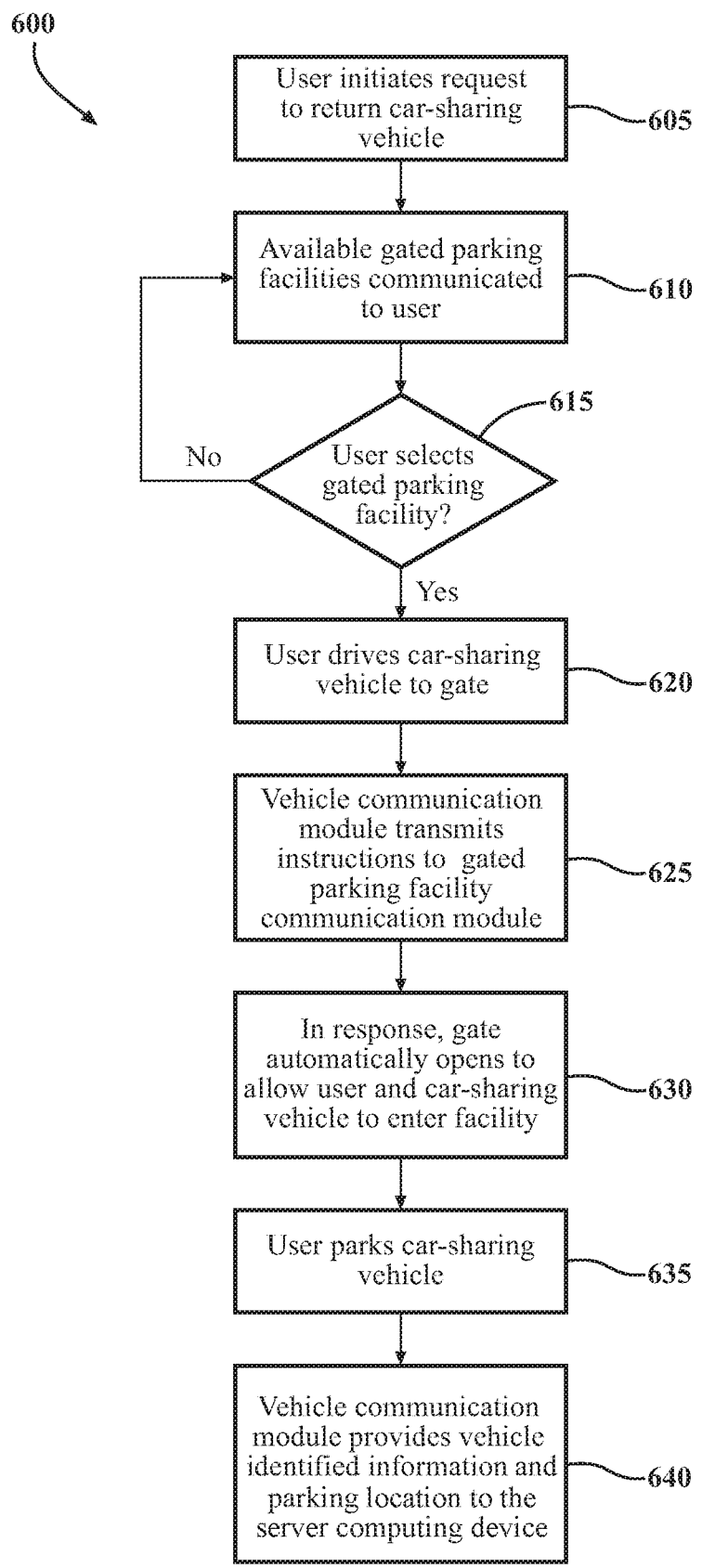
FIG. 6 depicts a flowchart of an illustrative method of a user initiating a human rental return of the example car-sharing vehicle according to one or more embodiments shown and described herein.

Now referring to FIG. 6, a flowchart of an illustrative method 600 of requesting to return the car-sharing vehicle is schematically depicted. In some embodiments, the vehicle communication module, the electronic control unit, the user interface, the server computing device, and the gate parking facility communication module may all be in continuous communication to execute the various steps depicted in FIG. 6.

The various components of the vehicle floating fleet system may monitor for a user input that corresponds to an initiation for the return request, such as the user initiates a request via the user interface, at block 605. In a non-limiting example, the user may use the software application on the user interface to initiate the request for the return of the car-sharing vehicle after driving the car-sharing vehicle normally. Once the input is received, the various components of the system communicate to provide and display, on the user interface, the available gated parking facility, at block 610. The user may continue to toggle between available gated parking facilities between blocks 610-615 until the user selects the desired gated parking facility, at block 615. It should be appreciated that available gated parking facilities near the user's destination may be communicated to the user in a variety of ways (e.g., through the mobile application, through the head unit of the vehicle, by audio messages, and the like). When the user arrives at the return gated parking facility, he or she drives up to the gate. The gate system and the communication module of the vehicle communicate such that the gate automatically opens so that the user may drive in and park the vehicle in any parking spot.

It should be understood that a plurality of floating fleet operators may have a plurality of car-sharing vehicles rented at a time that may be stored after renting at a plurality of gated parking facilities (e.g., the car-sharing vehicle is returned to a different gated parking facility than the one it was rented from). As such, when the vehicle communication module and the car-sharing vehicle arrives at the gated parking facility, the costs that the floating fleet operator of the car-sharing vehicle associated with storing the car-sharing vehicle are calculated and sent to the server computing device to bill the floating fleet operator the amount owed to the gated parking facility. As such, this occurs independent of the user and the user does not have to worry about paying any storage fees when entering the gated parking facility.

At block 620, the user drives the car-sharing vehicle to the selected gated parking facility where the vehicle communication module transmits instructions to the gated parking facility communication module, at block 625, which causes the gated parking facility communication module to communicate with the gate of the gated parking facility to automatically open such that the user and the car-sharing vehicle may enter the gated parking facility, at block 630. The instruction may be sent by any wireless communication protocol, such as Bluetooth®, WAN, LoRaWAN, and the like. It should be appreciated that in some embodiments, the communication exchange to open the gate may be performed locally without the use of the Internet (e.g., by Bluetooth®). The gate system receives the instruction from the vehicle communication module and opens the gate such that the user is not required to take any action to open the gate and does not need to worry about parking fees. In embodiments, the protocol to open the gate does not require a connection to the Internet but rather, it is negotiated locally between the vehicle communication module and the gate system. Further, information (e.g., vehicle identification number, vehicle make and model, and name of floating fleet system operator) may also be communicated from the vehicle communication module to the gate system of the return gated parking facility. This information may then be transmitted to the server computing device.

At block 635, the user proceeds to park the car-sharing vehicle, and at block 640, the vehicle communication module transmits car-sharing vehicle details to the server computing device. For example, the chosen gated parking facility and the precise parking location of the car-sharing vehicle is transmitted. In another example, the fuel level, the mileage, the heath of the car-sharing vehicle, and the like may be transmitted to the server computing device.

In some embodiments, the user enters the gated parking facility first, and then initiates the return of the car-sharing vehicle. In such a case, information regarding the most recent gated parking facility that was entered is provided to the server computing device.

Figure 7:
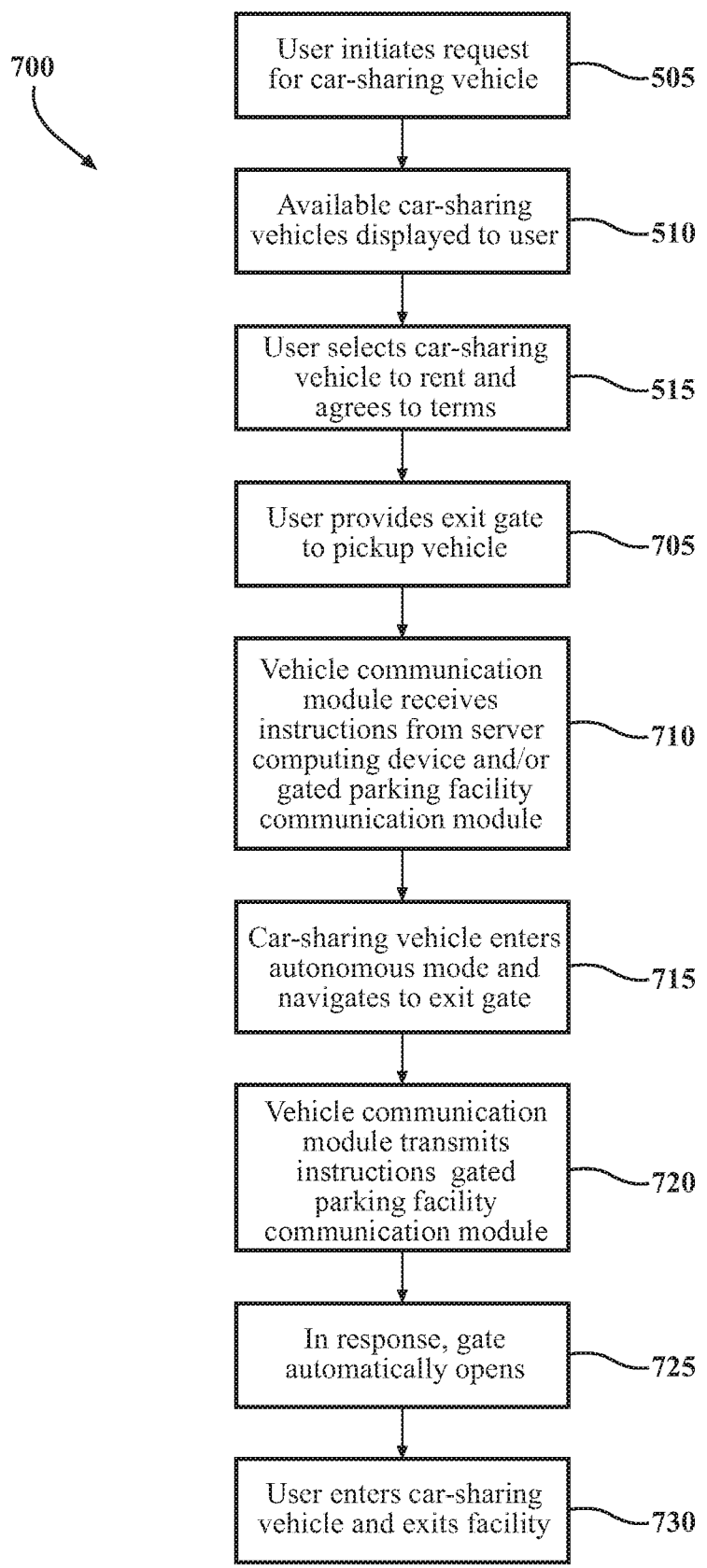
FIG. 7 depicts a flowchart of an illustrative method of a user initiating an autonomous request for a rental of the example car-sharing vehicle according to one or more embodiments shown and described herein.

Now referring to FIG. 7, a flowchart of an illustrative method 700 of requesting to rent the car-sharing vehicle where the car-sharing vehicle is autonomously driven to the gate for the user to pick up is schematically depicted. In some embodiments, the vehicle communication module, the electronic control unit, the user interface, the server computing device, and the gate parking facility communication module may all be in continuous communication to execute the various steps depicted in FIG. 7. The various components may monitor for a user input that corresponds to an initiation for the rental request, such as the user initiates a request via the user interface, at block 505. In a non-limiting example, the user may use a software application on the user interface to initiate the request for the rental of the car-sharing vehicle. Once the input is received, the various components of the system communicate to provide and display, on the user interface, the available car-sharing vehicles at various gated parking facilities, at block 510. The available car-sharing vehicles may be selected and displayed as described with respect to FIG. 5, for example. At block 515, the user selects the car-sharing vehicle and agrees to the terms of the rental policy.

Once the terms are accepted and the car-sharing vehicle is selected, in some embodiments, the user provides the exit gate to pick-up the car-sharing vehicle, at block 705. In response, the vehicle communication module receives the instructions of the gate location from the server computing device and/or the gated parking facility communication module, at block 710. The electronic control unit of the car-sharing vehicle takes control and proceeds to place the car-sharing vehicle in autonomous mode and navigates the gated parking facility to the selected exit gate, at block 715. The vehicle communication module transmits instructions to the gated parking facility communication module, at block 720, which causes the gated parking facility communication module to communicate with the gate of the gated parking facility to automatically open, at block 725, and the user enters the car-sharing vehicle and proceeds to exit the gated parking facility with the car-sharing vehicle now under normal mode (e.g. human control), at block 730. It should be appreciated that the instruction of block 720 may be sent by any wireless communication protocol, such as Bluetooth®, WAN, LoRaWAN, and the like. The gate system receives the instruction from the vehicle communication module and opens the gate such that the user is not required to take any action to open the gate. In embodiments, the protocol to open the gate does not require a connection to the Internet but rather, it is negotiated locally between the vehicle communication module and the gate system.

It should be understood that a plurality of floating fleet operators may have a plurality of car-sharing vehicles stored in the gated parking facility. When the vehicle communication module and the car-sharing vehicle exits the gated parking facility, the costs that the floating fleet operator of the car-sharing vehicle associated with storing the car-sharing vehicle are calculated and sent to the server computing device to bill the floating fleet operator the amount owed to the gated parking facility. As such, this occurs independent of the user and the user does not have to worry about paying any storage fees when leaving the gated parking facility.

Figure 8:
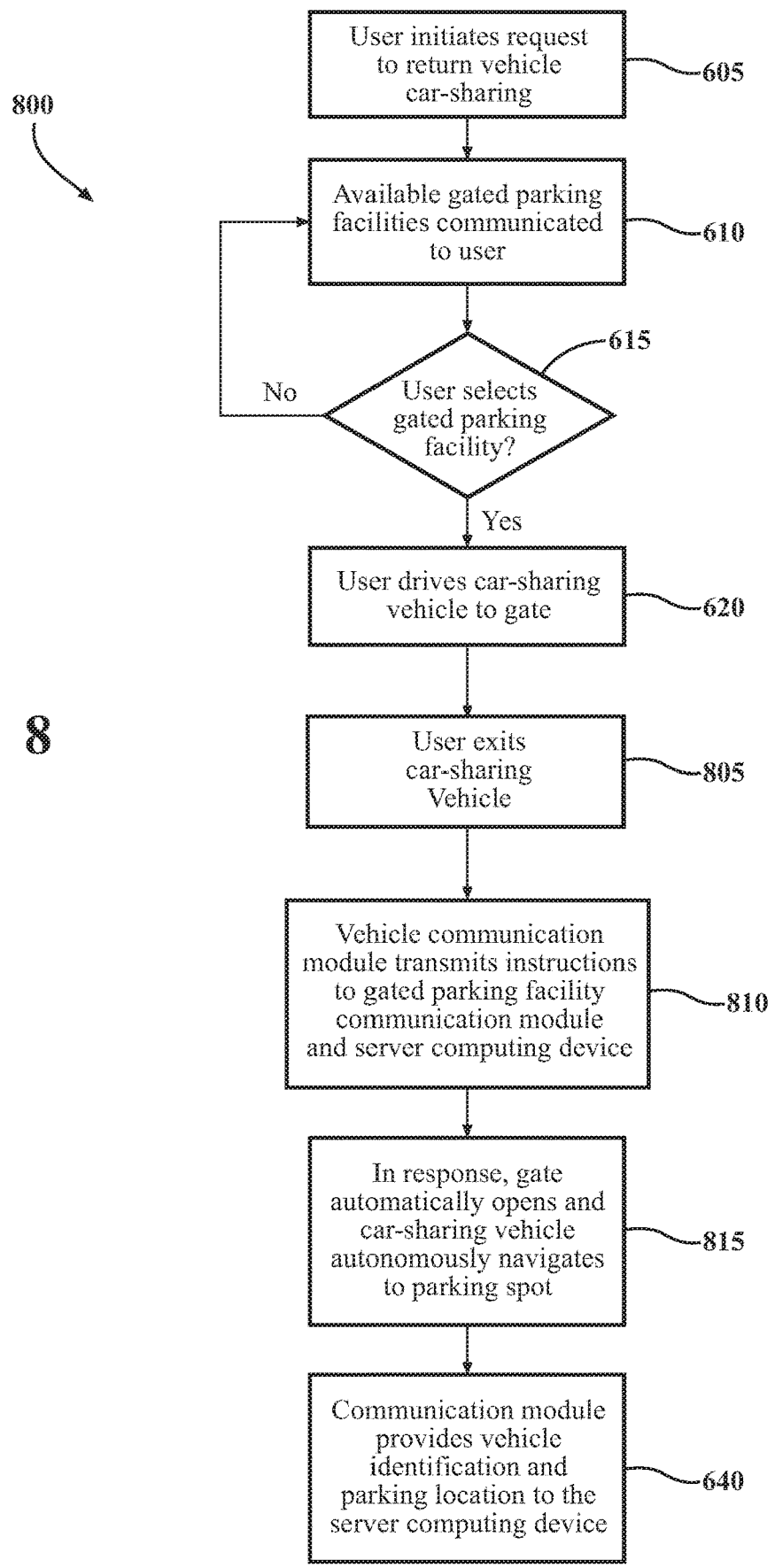
FIG. 8 depicts a flowchart of an illustrative method of a user initiating an autonomous rental return of the example car-sharing vehicle according to one or more embodiments shown and described herein.

Now referring to FIG. 8, a flowchart of an illustrative method 800 of requesting to return the car-sharing vehicle is schematically depicted. In some embodiments, the vehicle communication module, the electronic control unit, the user interface, the server computing device, and the gate parking facility communication module may all be in continuous communication to execute the various steps depicted in FIG. 8. The various components of the vehicle floating fleet system may monitor for a user input that corresponds to an initiation for the return request, such as the user initiates a request via the user interface, at block 605. In a non-limiting example, the user may use a software application on the user interface to initiate the request for the return of the car-sharing vehicle after driving the car-sharing vehicle normally. Once the input is received, the various components of the system communicate to provide and display, on the user interface, the available gated parking facility, at block 610. The user may continue to toggle between available gated parking facilities between blocks 610-615 until the user selects the desired gated parking facility, at block 615. It should be appreciated that available gated parking facilities near the user's destination may be communicated to the user in a variety of ways (e.g., through the mobile application, through the head unit of the vehicle, by audio messages, and the like). When the user arrives at the return gated parking facility, he or she drives up to the gate. The gate system and the communication module of the vehicle communicate such that the gate automatically opens so that the user may drive in and park the vehicle in any parking spot At block 620, the user drives the car-sharing vehicle to the selected gated parking facility where the user then exits the car-sharing vehicle at block 805. The vehicle communication module transmits instructions to the gated parking facility communication module, and the server computing device, at block 810, which causes the gated parking facility communication module to communicate with the gate of the gated parking facility to automatically open and the car-sharing vehicle to enter autonomous mode such that the car-sharing vehicle may enter the gated parking facility and navigate to a parking spot within the gated parking facility, at block 815. The instruction may be sent by any wireless communication protocol, such as Bluetooth®, WAN, LoRaWAN, and the like. It should be appreciated that in some embodiments, the communication exchange to open the gate may be performed locally without the use of the Internet (e.g., by Bluetooth®). The gate system receives the instruction from the vehicle communication module and opens the gate such that the user is not required to take any action to open the gate and does not need to worry about parking fees. In embodiments, the protocol to open the gate does not require a connection to the Internet but rather, it is negotiated locally between the vehicle communication module and the gate system.

At block 640, the vehicle communication module transmits car-sharing vehicle details to the server computing device. For example, the chosen gated parking facility and the precise parking location of the car-sharing vehicle is transmitted. In another example, the fuel level, the mileage, the heath of the car-sharing vehicle, and the like may be transmitted to the server computing device. In another example, information (e.g., vehicle identification number, vehicle make and model, and name of floating fleet system operator) may also be communicated from the vehicle communication module to the gate system of the return gated parking facility. This information may then be transmitted to the server computing device. It should be understood that a plurality of floating fleet operators may have a plurality of car-sharing vehicles rented at a time that may be stored after renting at a plurality of gated parking facilities (e.g., the car-sharing vehicle is returned to a different gated parking facility than the one it was rented from). As such, when the vehicle communication module and the car-sharing vehicle arrives at the gated parking facility, the costs that the floating fleet operator of the car-sharing vehicle associated with storing the car-sharing vehicle are calculated and sent to the server computing device to bill the floating fleet operator the amount owed to the gated parking facility. As such, this occurs independent of the user and the user does not have to worry about paying any storage fees when entering the gated parking facility.

It should now be understood that the systems and methods described herein are directed to improved vehicle floating fleet systems where the user may drop of a reserved car sharing vehicle at any gated parking facility (e.g., gated garage or gated parking lot) and thus the user is not required to drop the vehicle off at a dedicated pick-up and drop-off location. Because the vehicle floating fleet system enables car-sharing vehicles to be dropped off in any gated parking facility, the vehicles may be better distributed throughout an area. Therefore, the likelihood of a vehicle being close to a potential user is increased. The user may then not need to travel as far to reserve the car-sharing vehicle. Additionally, the user now has the benefit of parking the vehicle much closer to his or her destination.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle floating fleet system for determining a location of a user and one or more car-sharing vehicles, the system comprising:
    a gate controller configured to:
        track the one or more car-sharing vehicles via a Bluetooth or a global positioning system,
        determine a parking location for the one or more car-sharing vehicles,
        guide the one or more car-sharing vehicles, and
        activate a gate of a gated parking facility to automatically move between a closed and an open position;
    a server computing device operated by a floating fleet service provider, the server computing device communicatively coupled to the gate controller, the server computing device comprising:
- at least one processor;
- a memory communicatively coupled to the at least one processor; and
- machine readable instructions stored in the memory that cause the vehicle floating fleet system to perform at least the following when executed by the at least one processor:
  - receive a request for the one or more car-sharing vehicles,
  - determine the one or more car-sharing vehicles in one or more nearby gated parking facilities based on a predetermined radius of location of a user,
  - retrieve, from an electronic control unit of the one or more car-sharing vehicles, information about the one or more car-sharing vehicles includes
  - send information about the one or more car-sharing vehicles to the user,
  - receive a selected car-sharing vehicle in a nearby gated parking facility of the one or more nearby gated parking facilities from the user and a requested exit gate, and
  - initiate a command to the gate controller when the user is within the predetermined radius of location of the user of the selected gate location and a vehicle request that is transmitted to the electronic control unit of the selected car-sharing vehicle to cause the selected car-sharing vehicle to autonomously and automatically navigate the gated parking facility to move from the parking location to the requested exit gate such that the gate controller automatically opens the requested exit gate at the gated parking facility to automatically be present for the user to enter the selected car-sharing vehicle,
  - wherein when the selected car-sharing vehicle is exiting the gated parking facility, the electronic control unit communicates with the gate controller such that a cost that the floating fleet service provider of the selected car-sharing vehicle associated with storing the selected car-sharing vehicle is calculated by the gate controller and transmitted to the server computing device to invoice the floating fleet service provider an amount owed to the gated parking facility.

2. The vehicle floating fleet system of claim 1, wherein the machine readable instructions further cause the at least one processor to receive a location of the user.

3. The vehicle floating fleet system of claim 2, wherein the one or more car-sharing vehicles are within a predetermined radius of the location of the user.

4. The vehicle floating fleet system of claim 3, wherein the predetermined radius is selected by the user.

5. The vehicle floating fleet system of claim 2, wherein the machine readable instructions stored in the memory further cause the one or more processors to scan a vehicle inventory to find a nearest of the one or more car-sharing vehicles to the location of the user.

6. The vehicle floating fleet system of claim 5, wherein:
- the vehicle inventory is a real-time list such that the server computing device removes the selected car-sharing vehicle from the vehicle inventory of available car-sharing vehicles to prevent others from renting the selected car-sharing vehicle.

7. The vehicle floating fleet system of claim 6, wherein the information about the one or more car-sharing vehicles sent to the user is stored and accessible to the server computing device and displayed on a user interface.

8. The vehicle floating fleet system of claim 7, wherein the information includes a vehicle mileage, a vehicle health, a vehicle fuel level, and a present vehicle location for each car-sharing vehicle within the vehicle inventory.

9. The vehicle floating fleet system of claim 1, wherein the nearby gated parking facility is operated by different operators.

10. The vehicle floating fleet system of claim 1, wherein the machine readable instructions further cause the one or more processors to:
- receive a request to return the selected car-sharing vehicle,
- determine a return gated parking facility based on a location of the selected car-sharing vehicle;
- add the selected car-sharing vehicle to an inventory of available car-sharing vehicles;
- calculate a rental charge based on use of the selected car-sharing vehicle.

11. The vehicle floating fleet system of claim 10, wherein the nearby gated parking facility at which a user picked up the selected car-sharing vehicle is operated by a different operator than the return gated parking facility.

12. A vehicle floating fleet system for selecting one or more car-sharing vehicles, the system comprising:
- a gate controller configured to:
  - track the one or more car-sharing vehicles via a Bluetooth or a global positioning system,
  - determine a parking location for the one or more car-sharing vehicles,
  - guide the one or more car-sharing vehicles, and
  - activate a gate of a gated parking facility to automatically move between a closed and an open position;
- a user interface operated by a user, the user interface comprising:
  - at least one processor;
  - a memory communicatively coupled to the at least one processor; and
  - machine readable instructions stored in the memory that cause the vehicle floating fleet system to perform at least the following when executed by the at least one processor:
    - transmit a request for the one or more car-sharing vehicles,
    - display a location of one or more nearby gated parking facilities based on a predetermined radius of location of the user interface,
    - transmit a request for and receive from an electronic control unit of the one or more car-sharing vehicles a plurality of information regarding the one or more car-sharing vehicles in the one or more nearby gated parking facilities based on the predetermined radius of the determined location of the user interface, the plurality of information regarding the one or more car-sharing vehicles includes,
    - display the plurality of information regarding the one or more car-sharing vehicles in the one or more nearby gated parking facilities,
    - transmit a selected car-sharing vehicle in a nearby gated parking facility of the one or more nearby gated parking facilities and a requested exit gate from the user interface,
  - wherein the selection of the car-sharing vehicle, the requested exit gate, and the user interface positioned within the predetermined radius of location initiates a command to the gate controller indicative of the requested exit gate and a vehicle request that causes the selected car-sharing vehicle to autonomously and automatically navigate the gated parking facility to move from the parking location to the requested exit gate such that the gate controller automatically opens the requested exit gate at the gated parking facility to automatically be present for the user to enter the selected car-sharing vehicle, and wherein when the selected car-sharing vehicle is exiting the gated parking facility, the electronic control unit communicates with the gate controller such that a cost that the floating fleet service provider of the selected car-sharing vehicle associated with storing the selected car-sharing vehicle is calculated by the gate controller and transmitted to the server computing device to invoice the floating fleet service provider an amount owed to the gated parking facility.

13. The vehicle floating fleet system of claim 12, wherein the predetermined radius is selected by the user.

14. The vehicle floating fleet system of claim 13, wherein the predetermined radius is customizable by the user on the user interface.

15. The vehicle floating fleet system of claim 12, wherein the plurality of information includes a vehicle mileage, a vehicle health, a vehicle fuel level, and a present vehicle location for each car-sharing vehicle within a vehicle inventory.

16. The vehicle floating fleet system of claim 12, wherein the machine readable instructions further cause the one or more processors to:

transmit a request to return the selected car-sharing vehicle, display at least one return gated parking facilities based on a location of the selected car-sharing vehicle;

transmit a selected return gated parking facility of the at least one return gated parking facilities; and display a rental charge based on use of the selected car-sharing vehicle.

17. The vehicle floating fleet system of claim 12, wherein the plurality of information is filtered by the user to display on the user interface only the one or more car-sharing vehicles that meets the filtered information.

18. A method for a vehicle float fleet system, the method comprising:

initiating, by a user interface by a user, a request for a car-sharing vehicle;

determining, by a server computing device, a location of the user interface;

determining, by the server computing device, the one or more car-sharing vehicles in one or more nearby gated parking facilities based on the location of the user interface, retrieving, by the server computing device from an electronic control unit of each of the one or more car-sharing vehicles in the one or more nearby gated parking facilities, a plurality of information regarding the one or more car-sharing available vehicles including a vehicle mileage, a vehicle health, and a vehicle fuel level;

providing, by the server computing device, one or more available car-sharing vehicles within the one or more nearby gated parking facilities;

displaying, on the user interface, the one or more available car-sharing vehicles within the one or more nearby gated parking facilities and the plurality of information regarding the one or more car-sharing available vehicles;

selecting, on the user interface, a selected car-sharing vehicle and a selected gate, which initiates a command to a gate controller when the user interface is within a predetermined radius of location and a vehicle request that is transmitted to an electronic control unit of the vehicle to cause the selected car-sharing vehicle to autonomously and automatically navigate the gated parking facility, controlled by the gate controller, to move from a parked location to the requested exit gate at the gated parking facility such that the gate controller automatically opens the requested exit gate to automatically be present for the user to enter the selected car-sharing vehicle; and removing, by the server computing device, the selected car-sharing vehicle from the one or more available car-sharing vehicles within the one or more nearby gated parking facilities, wherein upon the selected car-sharing vehicle exiting the gated parking facility, the electronic control unit communicates with the gate controller such that a cost that the floating fleet service provider of the selected car-sharing vehicle associated with storing the selected car-sharing vehicle is calculated by the gate controller and transmitted to the server computing device to invoice the floating fleet service provider an amount owed to the gated parking facility.

* * * * *